United States Patent
Salzman et al.

(10) Patent No.: US 12,417,318 B2
(45) Date of Patent: Sep. 16, 2025

(54) CONFIGURING CONTEXT-BASED RESTRICTIONS FOR A COMPUTING DEVICE

(71) Applicant: Apple Inc., Cupertino, CA (US)

(72) Inventors: Paul W. Salzman, Palo Alto, CA (US); Christopher G. Skogen, Los Altos, CA (US); David S. Clark, San Jose, CA (US); Tyler D. Hawkins, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/672,655

(22) Filed: May 23, 2024

(65) Prior Publication Data

US 2024/0311513 A1     Sep. 19, 2024

Related U.S. Application Data

(63) Continuation of application No. 17/896,439, filed on Aug. 26, 2022, now Pat. No. 12,039,086, which is a
(Continued)

(51) Int. Cl.
*G06F 21/62* (2013.01)
*G06F 21/00* (2013.01)
(Continued)

(52) U.S. Cl.
CPC .......... *G06F 21/629* (2013.01); *G06F 21/45* (2013.01); *G06F 21/604* (2013.01);
(Continued)

(58) Field of Classification Search
CPC .. G06F 21/629; G06F 21/604; G06F 21/6281; G06F 21/305; H04L 63/102; H04L 63/104; H04L 63/108; H04L 63/20
See application file for complete search history.

(56) References Cited

U.S. PATENT DOCUMENTS

| | | |
|---|---|---|
| 2002/0035477 A1 | 3/2002 | Schroder et al. |
| 2006/0137017 A1 | 6/2006 | Evans et al. |

(Continued)

FOREIGN PATENT DOCUMENTS

| | | |
|---|---|---|
| CN | 1471021 A | 1/2004 |
| CN | 102822855 A | 12/2012 |

(Continued)

OTHER PUBLICATIONS

Furnham A., "Parental Attitudes to Pocket Money/Allowances for Children", Journal of Economic Psychology, 2001, vol. 22, No. 3, pp. 397-422.

(Continued)

*Primary Examiner* — Edward Zee
(74) *Attorney, Agent, or Firm* — Invoke

(57) ABSTRACT

In some implementations, a computing device can restrict the use of another computing device in certain contexts. For example, a parent may wish to use the parent's computing device to restrict her children's use of the children's computing devices while the children are in school while the children should be participating in some other activity. For example, the parent's controller device may be enabled to remotely configure and control the usage of the satellite device(s) without needing to physically access the satellite device. The parent may implement limitations, permissions, or different policies that may govern, for example, the ability of the satellite device to communicate with other devices, execute various application functionalities, run any particular software, and manage its own settings.

20 Claims, 12 Drawing Sheets

Related U.S. Application Data continuation of application No. 16/862,313, filed on Apr. 29, 2020, now Pat. No. 11,468,197.

(60) Provisional application No. 62/855,235, filed on May 31, 2019, provisional application No. 62/843,943, filed on May 6, 2019.

(51) Int. Cl.
    *G06F 21/45*      (2013.01)
    *G06F 21/60*      (2013.01)
    *H04L 9/40*      (2022.01)

(52) U.S. Cl.
    CPC ........ *G06F 21/6218* (2013.01); *H04L 63/102* (2013.01); *H04L 63/104* (2013.01); *H04L 63/108* (2013.01)

(56) References Cited

U.S. PATENT DOCUMENTS

| | | |
|---|---|---|
| 2009/0254656 A1 | 10/2009 | Vignisson et al. |
| 2011/0237221 A1 | 9/2011 | Prakash et al. |
| 2011/0238476 A1 | 9/2011 | Carr et al. |
| 2013/0040629 A1 | 2/2013 | Sprigg et al. |
| 2013/0052990 A1 | 2/2013 | Zhang |
| 2013/0345981 A1* | 12/2013 | van Os ............. H04M 1/72427 701/540 |
| 2014/0272894 A1 | 9/2014 | Grimes et al. |
| 2015/0304484 A1 | 10/2015 | Halmstad et al. |
| 2016/0050308 A1* | 2/2016 | Liu ........................ H04W 4/00 455/411 |
| 2016/0087713 A1 | 3/2016 | Oderman et al. |
| 2016/0232336 A1 | 8/2016 | Pitschel et al. |
| 2016/0381210 A1 | 12/2016 | Kenjalkar et al. |
| 2017/0013464 A1* | 1/2017 | Fish ...................... H04W 12/12 |
| 2017/0149795 A1 | 5/2017 | Day, II |
| 2017/0324743 A1 | 11/2017 | Nayshtut et al. |

FOREIGN PATENT DOCUMENTS

| | | |
|---|---|---|
| CN | 108055354 A | 5/2018 |
| DE | 60120062 T2 | 11/2006 |
| WO | 2011/022053 A1 | 2/2011 |

OTHER PUBLICATIONS

Zhu Liehuang et al., "A new entity authentication and access control scheme in satellite communication networks", Journal on Communications, Jun. 2018, vol. 39, No. 6, pp. 73-80 (English Abstract Available).

* cited by examiner

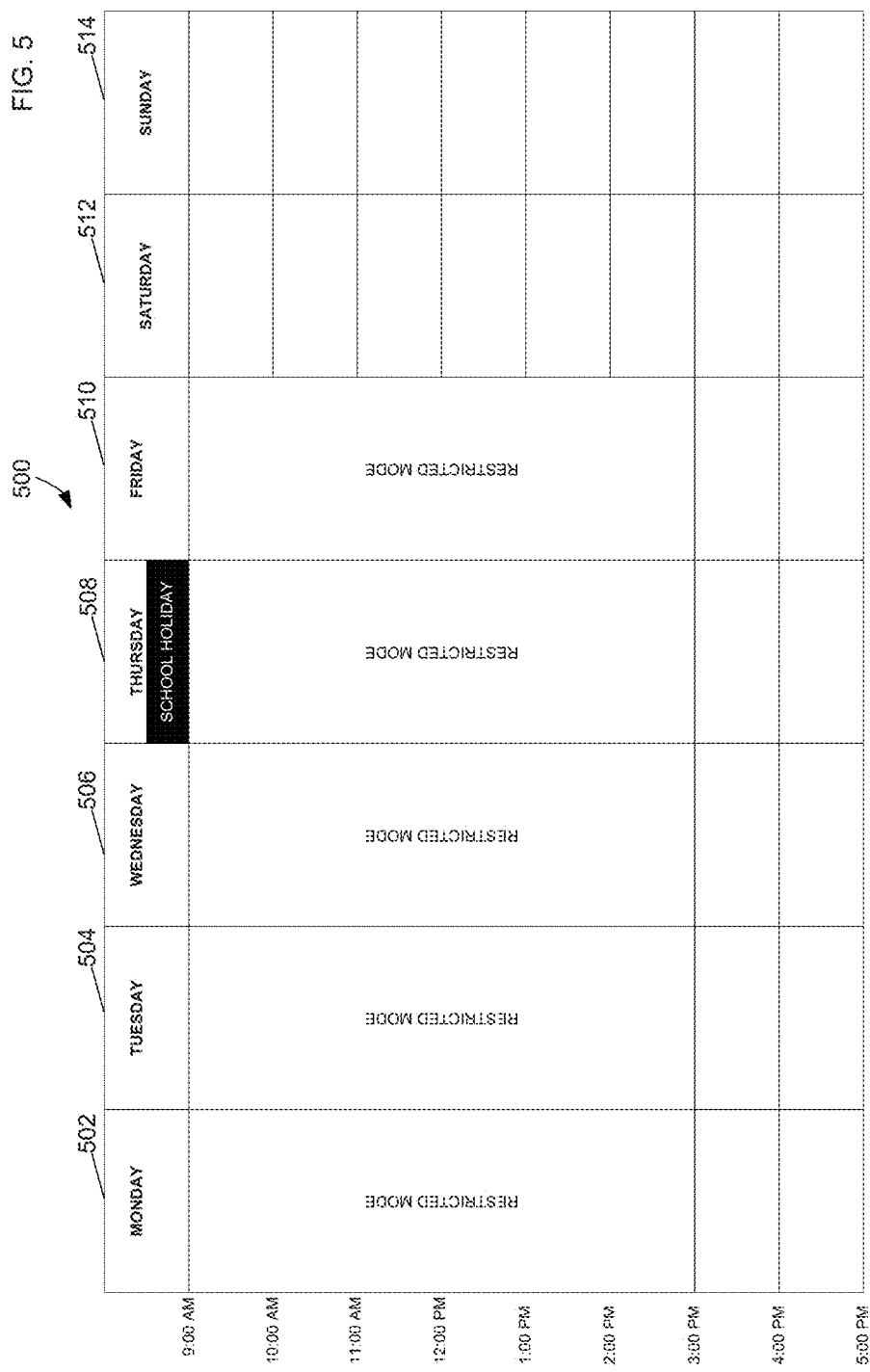

CONFIGURING CONTEXT-BASED RESTRICTIONS FOR A COMPUTING DEVICE

INCORPORATION BY REFERENCE; DISCLAIMER

Each of the following applications are hereby incorporated by reference: application Ser. No. 17/896,439 filed on Aug. 26, 2022; application Ser. No. 16/862,313 filed on Apr. 29, 2020; Application No. 62/855,235 filed on May 31, 2019; Application No. 62/843,943 filed on May 6, 2019. The applicant hereby rescinds any disclaimer of claims scope in the parent application(s) or the prosecution history thereof and advise the USPTO that the claims in the application may be broader that any claim in the parent application(s).

TECHNICAL FIELD

The disclosure generally relates to operating a computing device, and specifically to remotely restricting use of the device in particular contexts.

BACKGROUND

Modern mobile devices are often a distraction during the day when the user of such devices should be focused on a productive activity, like working, learning, or participating in some other productive activity.

SUMMARY

In some implementations, a computing device can restrict the use of another computing device in certain contexts. For example, a parent may wish to use the parent's computing device to restrict her children's use of the children's computing devices while the children are in school while the children should be participating in some other activity. For example, the parent's controller device may be enabled to remotely configure and control the usage of the child's device(s) without needing to physically access them. The parent may implement limitations, permissions, or different policies that may govern, for example, the ability of the child's device to communicate with other devices, execute various application functionalities, run any particular software, and manage its own settings.

Particular implementations provide at least the following advantages. A parent can remotely restrict functionality at a child's device without physically accessing the child's device. This facilitates the parent's management of the child's device use and eases the burden of device management on the parent, particularly because the parent can create restricted mode configurations for multiple devices without having to configure each device individually. Particular benefits also include a mode exit process that makes obvious a child's attempt to exit restricted mode. This improves the effectiveness of restricted mode and reduces the parent's configuration burden because the child is likely to avoid removing restricted mode configuration if the mode exit process is cumbersome and will alert another person. The parent is alerted to any functionality usage at the child's device, further improving reliability because the child knows that circumvention attempts will be reported to the parent and so the child may not make such attempts. The child's satellite device stays in restricted mode for longer times and thus uses less battery power, bandwidth, and processor cycles. This also improves device quality and reliability and lowers costs associated with bandwidth (e.g., data connections) usage and power usage as well. Also, the satellite device can still perform certain functions while in restricted mode, such as emergency communications or contacting the child's parents, further improving device usability.

Details of one or more implementations are set forth in the accompanying drawings and the description below. Other features, aspects, and potential advantages will be apparent from the description and drawings, and from the claims.

DESCRIPTION OF DRAWINGS

FIG. 5 is a calendar view indicating various days and times that a person can use to create restricted mode configurations for a computing device.

Like reference symbols in the various drawings indicate like elements.

DETAILED DESCRIPTION

As summarized above, the disclosed systems and methods enable a person to remotely configure context-based restrictions for another person's device. As used herein, "context-based restrictions" may refer to particular configurations generated at a first device to be implemented on a second device to restrict functionality of the second device.

The context-based restrictions may restrict functionality of the second device based on certain contexts. For example, an employer, such as an organization, may provide an employee with a mobile computing device. The device may be configured with enterprise management settings created by the employer's information technology department. These enterprise management settings may limit certain functionality of the employee's device in certain contexts (e.g., when the employee is at a workplace or at a client site or other work site). As another example, a parent may configure a child's device with context-based restrictions.

The parent may, for example, restrict the child's device from operating almost any functionality while the child is in school.

The context-based restrictions may affect the second device in other ways. For example, an employer may provide an employee with a mobile computing device. The employer may wish to see a record of all attempts to disable context-based restrictions made at the mobile computing device. The employer may configure context-based restrictions on the employee's mobile computing device that generate notifications at the mobile computing device notifying the employer that the employee attempted to disable context-based restrictions. The context-based restrictions may be a combination of two or more of the restriction types described above.

Figure 1:
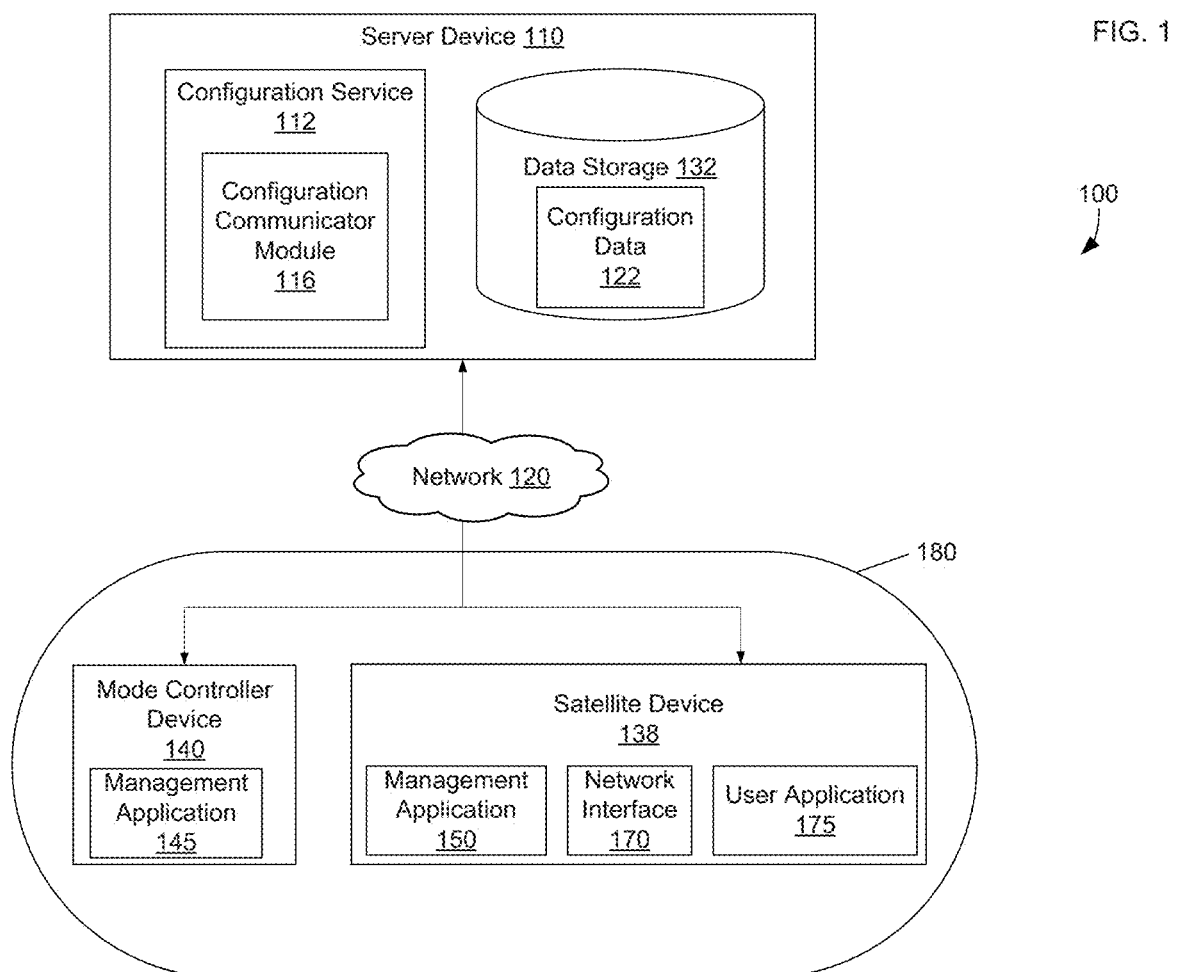
FIG. 1 is a block diagram of an example system for configuring context-based restrictions for a computing device.

FIG. 1 is a block diagram of an example system 100 for configuring context-based restrictions for a computing device. In some embodiments, system 100 enables a person to remotely restrict the use of another person's device. The use of a computing device may be restricted in different ways by particular usage scenarios or contexts. For example, an employer, such as an organization, may provide an employee with a mobile computing device. The device may be configured with enterprise management settings created by the employer's information technology department. These enterprise management settings may limit certain functionality of the employee's device in certain contexts (e.g., when the employee is at a workplace or at a client site or other work site). As another example, a parent may wish to configure a restricted mode for a child's device in certain contexts. The child may attend school during the day and take a satellite device with her to school. The parent may remotely configure the satellite device to be in a restricted mode that, for example, disables a portion of functionality of the satellite device until the child leaves a location.

In some embodiments, the restricted device may be referred to as a satellite device. As used herein, "satellite device" refers to an electronic device that is associated with an account that is in a group or family of user accounts. For example, a satellite device may be associated with an employee account for an employee of an organization that controls a group of employee accounts for its employees. As another example, a satellite device can be associated with an account of a minor aged (e.g., child or adolescent) member of a family that can be used as a companion device to the satellite device. Via the association with the family account, certain information can be synchronized between the satellite device and a controller device operated by a controlling user (e.g., an employer or a parent). During initial configuration, a set of cryptographic keys can be generated to associate the account of the satellite device with the set of accounts in the family. The satellite device can then access calendars, media, or other data (such as restricted mode configurations) that is shared with the family of user accounts. Additionally, a user having a family account that is configured as a parent (or guardian) account can push calendar or contact information to the satellite device via a server-based link between the guardian account and the account associated with the satellite device.

A satellite device as described herein can be a variety of wearable devices, including watches, GPS trackers, fitness trackers, glasses (e.g., virtual reality or augmented reality head mounted displays), jewelry, shoes, clothes, or other wearable items, heart monitors, health sensors, glucose monitors, audio accessories (e.g., headphones or earphones) and other accessories that can worn by a user. Thus, even though the portions of the following description focus on watches, embodiments provide techniques that can apply to other types of devices as well.

When a wearable accessory, such as a smartwatch, is paired with a companion device, the wearable accessory can rely upon the smartwatch to perform a significant amount of communication to remote devices and servers on behalf of the smartwatch. Data can then be relayed to the smartwatch via a low energy wireless connection. When a wearable accessory device is acting as a standalone or a satellite device, the accessory can act as a primary device and maintain network connections to remote servers on its own via, for example, a Wi-Fi or cellular connection.

Referring to FIG. 1, in some embodiments, system 100 can include mode controller device 140, satellite device 138, and server device 110. Any of mode controller device 140 and satellite device 138 can be a laptop computer, desktop computer, smartphone, tablet computer, smartwatch device, head-mounted display, other wearable device, or any other computing device. For example, system 100 can be a restricted mode configuration system that provides an operator of mode controller device 140 the ability to remotely restrict the use of satellite device 138 using network 120 (e.g., a local area network, wide area network, the Internet, etc.) and server device 110 for a defined period of time.

The restricted mode configurations that may be specified by a user, (e.g., configurations based on time, geolocation, device environment/condition, etc.), as well as any communications corresponding to those configurations, may be encrypted in an end-to-end encrypted manner as described herein. In this way, the configuration data is only accessible by the devices associated with the user (e.g., and/or children) and not by a server (e.g., server 110), thereby protecting user privacy.

A parent or controlling user such as an employer may generate restricted mode configurations using mode controller device 140 to manage a child's use of satellite device 138 in particular contexts. The restricted mode configuration(s) may remotely restrict the use of satellite device 138. For example, the restricted mode configuration may completely restrict satellite device 138 from being used except for a basic purpose (e.g., to display the time). The restricted mode configuration may limit or disable one or more functions or features of an application of satellite device 138 (e.g., communication features). The restricted mode configuration may limit or disable device features of satellite device 138 (e.g., volume/sound settings).

As used herein, "context" may refer to a particular location, a particular time, or a particular combination of location and time that corresponds to a usage environment that impacts how a device can be used. A particular location may correspond to a specific usage context. For example, a person may be able to freely use a computing device at home but may be required to disable one or more features when at an office where the person works. The person may need to disable any audio outputs from a device to prevent distraction to others, for example. Similarly, a particular time may correspond to a specific usage context. For example, a child may be able to use audio, video and text features of a computing device in the evening but may be prohibited from using any of the above features during school hours. Moreover, a combination of location and time may also correspond to a specific context. For example, when on an airplane during a flight, a child may be able to use any audio or visual features of a computing device (e.g., to watch a movie) but be prohibited from using communication features due to electronic interference problems that may be caused on the airplane. Similarly, a person may be required to disable one or more audio or display features in a movie theater during a movie screening.

Mode controller device 140 may execute a management application 145 that a user (e.g., a parent) may use to generate the restricted mode configurations. Management application 145 may provide various interfaces or controls for a parent to create a restricted mode configuration. Management application 145 may output a restricted mode configuration comprising a number of settings that restrict a satellite device 138 according to a parent's preferences.

In some embodiments, a parent creates a restricted mode configuration at mode controller device 140 (e.g., using management application 145). The restricted mode configuration can include a variety of restrictions, settings, and particular specifications. Any of these restrictions, settings, and specifications may alter one or more default behaviors or capabilities of a satellite device. For example, a parent may wish to restrict the satellite device at certain times and/or at certain locations. At those times or locations, the parent may want the satellite device to be completely disabled (e.g., when a child is at school). Accordingly, the parent may use management application 145 to generate a restricted mode configuration that restricts a satellite device from providing interactive features or responses to user interactions for a limited time (e.g., during a child's school hours). For example, the satellite device may apply a restricted mode configuration to a touch-sensitive display screen to disable the display screen. The display screen may stop responding to touch input while the satellite device is in restricted mode. The parent may also include exceptions to any configured restrictions. For example, the parent may specify particular applications that can still operate even if the satellite device is in a restricted mode. For example, in the school context, a child may require the ability to use a calculator application in a math class. The restricted mode configuration may disable all functionality on satellite device 138 but for the calculator application for the time period defined for the child's math class.

In some embodiments, the restricted mode configuration may also specify a mode exit process. A user of a satellite device can follow the mode exit process to exit the restricted mode and return the satellite device to a fully functional or default setting. The parent may configure the mode exit process when creating the restricted mode configuration. In some embodiments, the mode exit process may be designed to make it obvious to an onlooker that the user is attempting to exit the restricted mode. Moreover, attempts to exit restricted mode may be recorded at the satellite device and reported to the controller device. For example, a child may attempt to exit a restricted mode using the mode exit process. The process may require a child's full attention for a particular length of time. The process may require extensive interaction with the satellite device, making it obvious to an observer (i.e., a teacher) that the child is attempting to exit restricted mode.

In some embodiments, the restricted mode configuration can be a data structure or structured data object that comprises all of the parent's desired restrictions, settings, or exceptions. A satellite device may be configured to evaluate the contents of the data structure. The satellite device may identify each restriction and implement them upon the relevant applications or components of the satellite device.

Additionally, the parent may use mode controller device 140 to view updates regarding the restricted mode configurations. For example, when a child tries to circumvent the configurations or use any restricted features, mode controller device 140 may show the parent a report of such actions.

In some embodiments, the parent may transmit these restricted mode configurations via server 110 to satellite device 138. In other embodiments, mode controller device 140 may send these configurations directly to the satellite device 138 directly through a peer to peer connection (e.g., Bluetooth, peer-to-peer Wi-Fi, etc.) or through some other network connection that does not include server 110.

In some embodiments, each computing device (e.g., mode controller device 140, satellite device 138) may be registered within a group of devices (e.g., a family group) that are associated with each other. For example, each computing device may be associated with a different user account and each user account can be associated with a family group. A family of users (e.g., two parents and their children) may each have a particular user account, for example. The family's user accounts may be associated together in a user account family or user account network. The associations between user accounts may be further defined. For example, when purchasing or activating the devices, a parent may configure one user account as a parent account that can configure or control the other user accounts or computing devices being used with the other user accounts. Similarly, the parent account may be given authorization to control use of any child accounts through the restricted mode configurations described herein. The parent account may be authorized so that any device associated with the parent account can change functionality of any satellite device or any device associated with an account registered to the parent's children.

In other words, a parent may configure a computing device for the parent's personal use and as a controller device. The parent may configure the other devices as satellite devices that are subsidiary to the controller device in that the satellite devices accept remotely generated configurations that affect usage of the satellite device. Additionally, the described restricted mode configurations may be applied to any satellite device, not just one operated by a child. For example, a person may wish to apply similar restricted mode configurations to the satellite device of an older user, a user with a disability, or anyone with a limited ability to productively or responsibly use a mobile device without causing device errors or inconveniences to the user. As an example of this usage context, a person may use mode controller device 140 to implement a restricted mode configuration on satellite device 138 operated by an elderly user (e.g., an elderly parent). The person may wish to ensure that the elderly user's preferred device settings remain in place and are not altered by accidental modifications by the elderly user until such time as the elderly user becomes more familiar with the device. Similarly, a person may create restricted mode configurations for a vision-impaired user that later prohibit changes to certain audio or touch input settings so that the vision-impaired user can use the device without accidentally altering critical settings (e.g., by accidentally disabling touch input or audio output, etc.)

In some embodiments, each of mode controller device 140 and satellite device 138 are included within a family of associated devices as described above. Accordingly, FIG. 1 shows that mode controller device 140 and satellite device 138 may be included in a device group 180. In other embodiments, these devices are not associated as devices, but the accounts associated with each device are associated together as a family of user accounts as described above. In some embodiments, satellite device 138 may receive a data message including a restricted mode configuration for managing satellite device 138 from a controller device. The restricted mode configuration may be defined by a user of mode controller device 140. As described above, a parent may implement restricted mode configurations for a child's satellite device. Satellite device 138 may be configured to identify, based on the data message, an account identifier associated with mode controller device 140. Satellite device 138 may also be configured to determine an account identifier of a user of mode controller device 140.

FIG. 1 shows satellite device 138, that may include management application 150, network interface 170, and user application 175. User application 175 is an example of an application that can be managed or disabled using a restricted mode configuration generated at mode controller device 140.

In some embodiments, management application 150 at satellite device 138 may be configured to implement the received restricted mode configurations. For example, management application 150 may be configured to receive the restricted mode configuration and identify each configuration setting and its intended target (e.g., an application feature or a system setting). At the time the configuration is to take effect, management application 150 may activate the restricted mode configuration. The activation of restricted mode configuration may override the functionality of applications other than management application. For example, when management application 150 activates the restricted mode configuration, management application 150 may be the only actively executing application. Satellite device 138 may have disabled all other applications. Management application 150 may be operating just to provide a mode exit process. Management application 150 may also operate to track the current time so that the restricted mode can be lifted once the end time specified by the restricted mode configuration arrives.

In other embodiments, the restricted mode configurations may be designed to directly impact applications or functionality at the satellite device without the presence of a management application. For example, a parent may generate a restricted mode configuration at mode controller device 140. The generated restricted mode configuration may be designed to directly limit the functionality of user application 175 without the execution of management application 150.

In some embodiments, the restricted mode configuration may completely disable application functionality, such as for user application 175. In other embodiments, the restricted mode configuration may permit some functionality of user application 175 to continue running as a background process but may disable any display or output from satellite device 138 to a user. For example, user application 175 may be a gaming application with a display icon. When a user clicks, taps, or otherwise interacts with the display icon, user application 175 may be configured to display a game interface that enables game play. In some embodiments, with the restricted mode configuration in effect, the display icon for user application 175 may disappear. In other embodiments, the display icon may continue to display but interaction with the display icon may result in no effect or no display of other interfaces of the application. The restricted mode configuration may also disable user application 175 from presenting any notifications or messages to the user of satellite device 138 while restricted mode is in effect.

In one embodiment, the restricted mode configuration may function as a service or operating system code that, for example, inhibits the ability of user application 175 to connect to network interface 170. In this embodiment, the restricted mode configuration may not require a management application to execute on satellite device 138 in order to configure it or may generate a restricted mode configuration that directly affects a functionality of satellite device 138 without involving an installed management application.

Satellite device 138 may be configured to determine that the account identifier is a member of a trusted group of account identifiers (e.g., a family group). For example, satellite device 138 may recognize the account identifier of a parent. As another example, satellite device 138 may recognize the account identifier to belong to a family group of account identifiers (e.g., a family of users) that also includes the user account identifier currently being used at satellite device 138. Moreover, mode controller device 140 may be associated with an account within the family group that has been authorized to configure satellite device 138. Accordingly, satellite device 138 may determine that the account identifier is for an account that is authorized to create restricted mode configurations for satellite device 138. In response to determining that the account identifier associated with the received restricted mode configuration is authorized to create restricted mode configurations, satellite device 138 may be configured to automatically apply the restricted mode configuration. In one embodiment, satellite device 138 implements the restricted mode configuration to restrict a user's access to one or more features of satellite device 138.

The child may use management application 150 on satellite device 138 to review the restricted mode configuration and understand details of the configured restrictions (e.g., time that restrictions are in effect, changes to application behaviors and use, exceptions etc.).

Management application 150 may, for example, display all restrictions specified in the restricted mode configuration. For example, management application 150 may be configured to extract data from one or more data structures included within the restricted mode configuration. Management application 150 may then populate display interfaces with the extracted data. The data may specify applications that should be disabled (e.g., social media applications) and so a list of prohibited applications may be displayed. The data may specify restricted features (e.g., any video viewing features may be disabled, regardless of application).

Similarly, management application 150 may also display any permitted applications or exceptions to any restrictions. For example, the restricted mode configuration may permit a clock application to view the time. The restricted mode configuration may permit an interface that can be used for a mode exit process. The restricted mode configuration may permit an application critical to the child's health or safety (e.g., a blood glucose monitoring application). The restricted mode configuration may specify certain contacts (e.g., the child's parents) that can still communicate with the child even as communication applications are otherwise disabled.

On satellite device 138, management application 150 may be configured to provide notifications of attempts to circumvent restricted mode configurations. Accordingly, when not in restricted mode, the child may use management application 150 at satellite device 138 that is similar to management application 145 at mode controller device 140 to review the received restricted mode configuration and see how the configuration limits the functionality of satellite device 138. However, restricted mode configuration settings may be read-only and not editable when viewed at satellite device 138. In some embodiments, the transmitted restricted mode configuration configures satellite device 138 so that any attempt to circumvent the restricted mode configuration generates a notification that is transmitted to mode controller device 140. In other embodiments, the parent can use management application 145 at mode controller device 140 to configure what notifications should be provided.

Moreover, satellite device 138 may also be configured to locally store data for each attempt to circumvent or exit restricted mode configuration. For example, satellite device 138 may log each attempt to disconnect satellite device 138 from a communications network during restricted mode. Satellite device 138 may also locally log each use of the mode exit process and what functionality was used. For example, if a child exits and then reenters restricted mode, a log of the child's circumvention or exit of restricted mode and any functionality used may be stored locally on satellite device 138. In some embodiments, a parent or teacher can view the local log on satellite device 138. For example, a child may surreptitiously exit restricted mode during a test, look up test answers using a social media application or a web browser application, then reenter restricted mode. If a teacher suspects that the child exited restricted mode, the teacher may be able to view the local log stored on the child's satellite device 138 and determine whether the child exited restricted mode and what functionality was used.

FIG. 1 shows server device 110 that can include configuration service 112 and data storage 132. Configuration service 112 can include configuration communicator module 116. Data storage 132 can include configuration data 122.

In some embodiments, server device 110 can automatically send the stored restricted mode configuration associated with the user account identifier to the new device associated with the user account identifier (e.g., associated with a child) when the new device is detected. The new device can then apply the restricted mode configuration settings on the new device, as appropriate. For example, since different devices have different capabilities, some of the restricted mode configuration settings specified for a previous device may not be applicable to the new device that may have different capabilities than the previous device. The new device can apply the restricted mode settings that are relevant to the new device's capabilities while ignoring settings for capabilities and/or features that are not supported by the new device.

Data storage 132 includes configuration data 122. Configuration data 122 may store a group of user account identifiers as a user account family. Configuration data 122 may also store a mapping between user account identifiers and device identifiers. For example, one user may have multiple devices. When mode controller device 140 transmits a restricted mode configuration to server device 110, mode controller device 140 can include a user account identifier. Server device 110 may be configured to transmit the restricted mode configuration to all devices of the targeted user using the mapping stored in configuration data 122. As described earlier, contents of the restricted mode configuration and any other communication between mode controller device 140 and satellite device 138 that routes through server device 110 may be end-to-end encrypted. However, the user account identifier for the target user may be unencrypted to enable server device 110 to determine the targeted user and her device or devices. Additionally, where server device 110 loses network connectivity via network 120 to, for example, satellite device 138, configuration data 122 may cache the restricted mode configuration in encrypted form until network connectivity is reestablished between server device 110 and satellite device 138.

Configuration service 112 includes configuration communicator module 116. In some embodiments, the parent may wish to reduce notifications to the parent's mode controller device 140 of each attempt to exit restricted mode on a child's satellite device 138. Configuration communicator module 116 may be configured to receive restricted mode configurations from mode controller device 140 and transmit them to the targeted satellite device (e.g., satellite device 138). In some embodiments, configuration communicator module 116 may receive data transmissions or messages from mode controller device 140 that include restricted mode configurations and identifiers for a user account of the targeted satellite device. In some embodiments, mode controller device 140 may encrypt the restricted mode configurations but not the user account identifier so that configuration communicator module 116 is able to transmit the restricted mode configurations to the correct user.

In one embodiment, mode controller device 140 may be configured to encrypt the restricted mode configuration and transmit it to server device 110 along with an identifier of, for example, satellite device 138. Server device 110 may then transmit the encrypted restricted mode configuration to satellite device 138. Satellite device 138 may be configured to decrypt the received restricted mode configuration and apply the settings specified therein on satellite device 138.

In one embodiment, mode controller device 140 and satellite device 138 may use an encrypted messaging service to communicate with each other whereby server device 110 cannot decrypt or access the contents of any message exchanged between mode controller device 140 and satellite device 138. In another embodiment, mode controller device 140 and satellite device 138 may exchange encryption keys using a peer-to-peer communication link that does not involve server device 110. For example, a parent may use a peer-to-peer communication link to exchange encryption keys between the parent's mode controller device 140 and satellite device 138. In this embodiment, mode controller device 140 and satellite device 138 may not use a messaging service that provides encryption but may use separate encryption and decryption capabilities on the devices to secure messages that are sent via server device 110.

In some embodiments, server device 110 cannot decrypt or access the contents of any restricted mode configuration. For example, while satellite device 138 may have the keys necessary to decrypt the encrypted restricted mode configurations, server device 110 may not have the encryption keys necessary to decrypt the encrypted restricted mode configurations. However, in some embodiments, server device 110 may be configured to store restricted mode configurations in association with identifiers for the user account family that includes users of mode controller device 140 and satellite device 138. When a new device is associated with an account identifier, server device 110 may be configured to search stored user accounts and user account families. Server device 110 may then be configured to identify whether the new device is associated with a user account that belongs to a particular user account family. Server device 110 may be configured to identify if there is a user (e.g., a parent) in that user account family that is authorized to create restricted mode configurations. If server device 110 finds a user that is so authorized, server device 110 may be configured to notify a controller device (e.g., mode controller device 140) of that user and invite the user to provide restricted mode configurations. Server device 110 may additionally or alternatively provide existing restricted mode configurations to the user with a suggestion to implement one or more of these onto the newly activated device.

Figure 2:
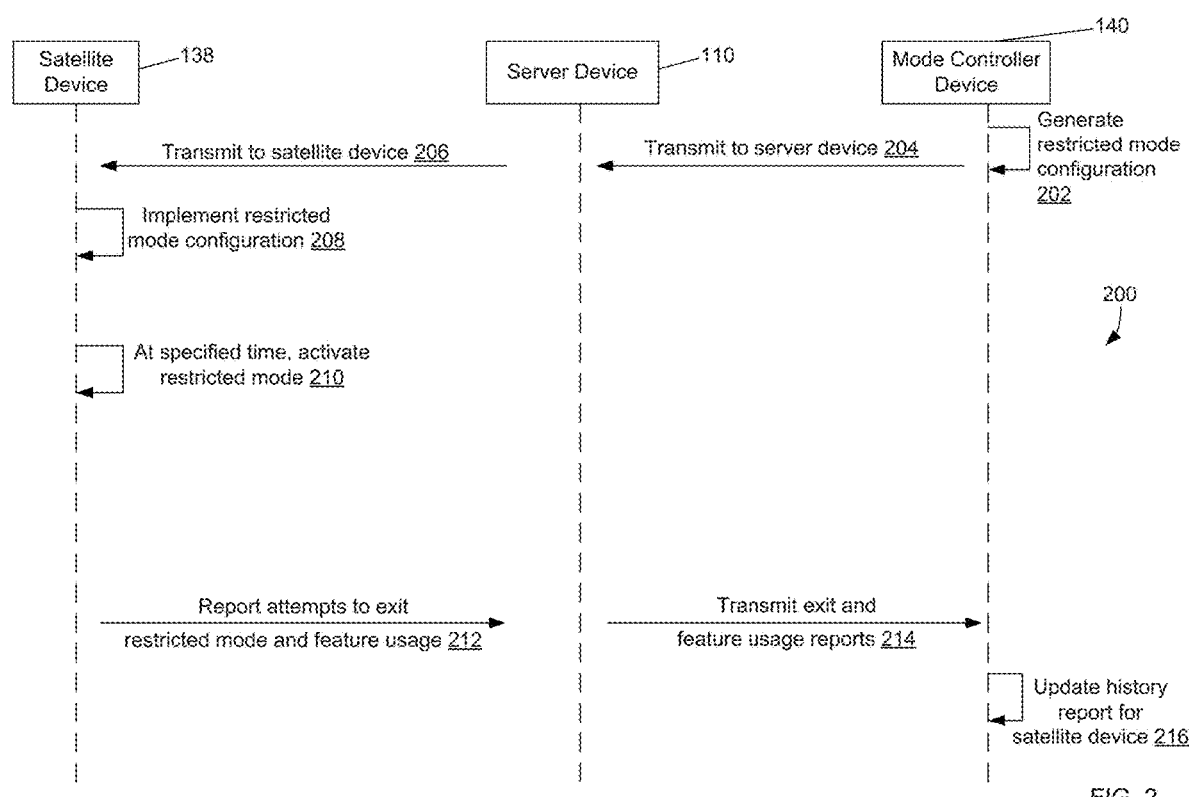
FIG. 2 is a system interaction diagram for configuring restricted mode configurations for a computing device and transmitting these configurations via a server device.

FIG. 2 is a system interaction diagram 200 for configuring context-based restrictions for a computing device. FIG. 2 shows satellite device 138, server device 110, and mode controller device 140 interacting with each other to generate, transmit, and enforce restricted mode configurations on satellite device 138.

For example, a parent may use mode controller device 140 and a child may use satellite device 138. The child may use the device in various contexts, such as at home, at school, and outdoors. While the child is at school, the parent may wish to restrict some or all of the functionality of satellite device 138 so that the child can avoid distractions and focus on school work. Accordingly, and as shown at step 202, a parent may use mode controller device 140 to generate a restricted mode configuration to restrict one or more features of a child's satellite device 138. As another example, the parent may enforce a restricted mode on the parent's own device while the parent is, for example, at work, so the parent can focus on work and avoid distractions arising from use of another satellite device or even mode controller device 140.

In some embodiments, the restricted mode configuration may comprise multiple settings, rules, or preferences. For example, the restricted mode configuration may include a time during which restricted mode is in effect. A parent may, for example, enforce restricted mode on a child's device while the child is in school (e.g., from 9:00 AM to 3:00 PM).

The restricted mode configuration may define that all functionality on satellite device 138 is to be disabled. For example, once restricted mode begins, the display of satellite device 138 may show a black screen or a generic, non-interactive image. When such complete restriction is configured, satellite device 138 may be functionally unusable except if the child performs a mode exit process (described below with respect to FIGS. 6a-c).

The restricted mode configuration may also include settings regarding whether satellite device 138 is to be completely or partially restricted from executing any functionality. For example, a parent may create a restricted mode configuration that imposes a total restriction on any functionality of satellite device 138 until the restricted mode period ends. As another example, the parent may specify partial restrictions such that certain functionalities or features of satellite device 138 may still be permitted to execute.

Similarly, the parent may specify that a specific user application (e.g., user application 175) be permitted to be active. For example, user application 175 may be a health-related application that the child requires to maintain stable health conditions. For example, the health-related application may be used to monitor the child's vital statistics due to the child suffering from an illness. The parent may specify that user application 175 should still be permitted to be fully functional even as all other applications and system-level functions are disabled. In this example, user application 175 may provide notifications, communicate with other devices, store data, receive inputs, and operate without any restriction due to a restricted mode configuration.

The parent may specify that background processes (e.g., application updates, operating system updates etc.) may continue to run during restricted mode. For example, the parent may wish to ensure that the child be able to receive notifications from the parent, particularly if the parent makes multiple attempts to contact satellite device 138. In this example, communication functionality of satellite device 138 (e.g., network communication devices, antennas, communication interfaces, etc.) may still be permitted to fully execute their functionality.

In addition, the restricted mode configuration may be generated to cause satellite device 138 to suppress all alerts or notifications (e.g., notifications of a new text message). In other words, no notifications, alerts, pings, telephone rings, or similar notification outputs may be generated at satellite device 138 during restricted mode. In some embodiments, notifications from critical applications (as in the health-related application example above) may still be permitted.

At step 204, mode controller device 140 may transmit the generated restricted mode configuration to server device 110. In some embodiments, controller device 140 may be configured to encrypt the restricted mode configuration and transmit it to server device 110 along with an identifier of, for example, satellite device 138. Server device 110 may then transmit the encrypted restricted mode configuration to satellite device 138. Satellite device 138 may be configured to decrypt the received restricted mode configuration and apply the settings specified therein on satellite device 138.

Moreover, mode controller device 140 also transmits one or more identifiers for the target satellite device to server device 110. In some embodiments, mode controller device 140 encrypts the restricted mode configurations but not an identifier for satellite device 138 so that server device 110 is able to transmit the restricted mode configurations to the correct target device.

Satellite device 138 receives the restricted mode configuration from server device 110. In addition, satellite device 138 may receive a user account identifier for the user (e.g., a parent) that created the restricted mode configuration.

In some embodiments, satellite device 138 may evaluate whether the account used to generate the restricted mode configuration is authorized to cause satellite device 138 to receive and apply the restricted mode configuration. More specifically, satellite device 138 may evaluate the user account identifier for the creator of the restricted mode controller device 140. Satellite device 138 may determine whether the user account identifier has the correct permissions to enforce a restricted mode configuration on satellite device 138. In one embodiment, satellite device 138 may retrieve, from server device 110, family group data such as user account identifiers for each user account in the family and permissions associated with each user account identifier. Satellite device 138 may compare the family group data with the account identifier received with the restricted mode configuration. As an example, a parent may send a restricted mode configuration to her child's satellite device 138. The child's satellite device 138 determines that the parent's user account identifier that was received with the restricted mode configuration is a user account identifier with the correct family group membership and permissions. For example, the child's satellite device 138 may check whether the account identifier is for a parent of this child according to the family group data. The child's satellite device 138 may also evaluate whether the account identifier has permissions to create and send this restricted mode configuration. If the child's satellite device 138 determines that the sender is in the correct family group and has the correct permissions, the child's satellite device 138 may determine that the sender is authorized. By contrast, a teacher may transmit a restricted mode configuration to the child, where the teacher does not share any family group membership with the child. In such a case, the child's satellite device 138 may not consider the sender authorized and ignore the restricted mode configuration.

Alternatively, in other embodiments, server device 110 may determines whether a user account associated with mode controller device 140 is authorized to implement restricted mode configurations. For example, server device 110 may evaluate user account identifiers or other account credentials associated with mode controller device 140 and/or the received restricted mode configuration to determine if the restriction mode configuration was received from or generated by an authorized user account. In some embodiments, server device 110 may evaluate the account identifiers transmitted from mode controller device 140 and may determine whether the user of controller device 140 is authorized to configure restricted modes on satellite device 138. Server device 110 may also receive identifiers for the target device to be managed using the restricted mode configuration. Server device 110 may evaluate whether the user account identifier associated with controller device 140 is authorized to implement restricted mode configurations on the particular satellite device that has been identified as a target. In some embodiments, if server device 110 determines that the user account identifier associated with the restricted mode configuration is authorized, server device 110 may transmit the restricted mode configuration received from controller device 140 to satellite device 138 at step 206. In some embodiments, server device 110 may also transmit the account identifiers or device identifiers received in conjunction with the restricted mode configuration to satellite device 138.

Satellite device 138 may be configured to implement the specified restricted mode, at step 208. In one embodiment, restricted mode configuration is implemented immediately on satellite device 138. In another embodiment, restricted mode configuration is not implemented until it is time to activate or switch to restricted mode on satellite device 138. Implementing the restricted mode configuration refers to satellite device 138 preparing to activate the restricted mode configuration at the specified time. For example, to implement the restricted mode configuration, an operating system of satellite device 138 or management application 150 may transmit commands to multiple applications operating on satellite device 138 to deactivate their display icons at a future specified time. The operating system may schedule the display screen of satellite device 138 to be disabled at the specified time. Enforcing the restricted mode configuration, as described herein, prevents a child from attempting to circumvent one or more parameters of the restricted mode configuration before it takes effect.

At the time specified by the restricted mode configuration, satellite device 138 may be configured to transition into restricted mode, at step 210. As described above, entering restricted mode may result in satellite device 138 deactivating some or all of its functions unless a particular mode exit process is followed to exit restricted mode. In some embodiments, satellite device 138 may also be configured to enter a low-power consumption mode on activating restricted mode. In some embodiments, satellite device 138 may be configured to maintain certain communication hardware (e.g., cellular radio, antennas, or other mobile communication hardware) in an active state or an active but low-power state so that satellite device 138 can still receive important communications (e.g., emergency alerts).

During the time that satellite device 138 is in restricted mode, a user of satellite device 138 may attempt to circumvent the restricted mode. For example, a child may disconnect satellite device 138 from a communications network (e.g., put the device into 'airplane mode') before the child knows that a restricted mode configuration will be received or will take effect, in an attempt to prevent restricted mode from being implemented or activated. In the case of satellite device 138 being a wearable device, a child may attempt to take off satellite device 138 or give it to someone else or drain its power. In other situations, the child may perform the mode exit process on satellite device 138 and exit restricted mode before it is time for restricted mode to end.

Any of the abovementioned situations or any other attempt to circumvent or remove restricted mode is, in some embodiments, reported at step 212 by satellite device 138 back to mode controller device 140 (e.g., via server device 110). In some embodiments, satellite device 138 may also report the specific features or functionality used at satellite device 138 once restricted mode was circumvented or exited. Additionally, satellite device 138 may be configured to transmit mode exit and feature usage reports in encrypted form such that they are readable only by mode controller device 140.

Moreover, in some embodiments, satellite device 138 may be configured to reenter restricted mode soon after it is exited. For example, a child may exit restricted mode using the mode exit process. In some embodiments, the restricted mode configuration may define that restricted mode is to be reactivated within a certain time (e.g., 5 minutes) after it was exited. In other embodiments, the restricted mode configuration may define that restricted mode is to be reactivated based on certain gestures or movements. For example, satellite device 138 may be a wearable device that is sensitive to body movements. A wearable computing device such as a watch may detect when a user is bending her arm to lift the watch up (e.g., "watch up" position) and viewing the watch face from the wrist and may also detect when the user brings her arm back down to a relaxed position (e.g., "watch down" position). Accordingly, satellite device 138 may be configured to detect if restricted mode was exited while the watch was in a "watch up" position and reenter restricted mode as soon as satellite device 138 comes to a "watch down" position.

At step 214, server device 110 may be configured to transmit mode exit and feature usage reports to mode controller device 140. In some embodiments, server device 110 receives mode exit and feature usage reports from satellite device 138 in encrypted form. In some embodiments, server device 110 may be configured to generate batched reports for transmission to mode controller device 140 at periodic intervals (e.g., weekly). In other embodiments, server device 110 may be configured to immediately forward any received mode exit or feature usage report to mode controller device 140.

At step 216, mode controller device 140 may be configured to receive mode exit or feature usage reports and compile these into a history report of such incidents for a user of mode controller device 140. The history report may be updated on an ongoing basis to account for new incidents. For example, a parent may be able to view, on mode controller device 140, a history of attempts to exit restricted mode, what features were used on satellite device 138, the particular dates and times, and any specific patterns of such behavior. The longer term history enables the parent to tailor restricted mode configurations to better suit the child's schedule and discuss any concerning patterns with the child.

Figure 3:
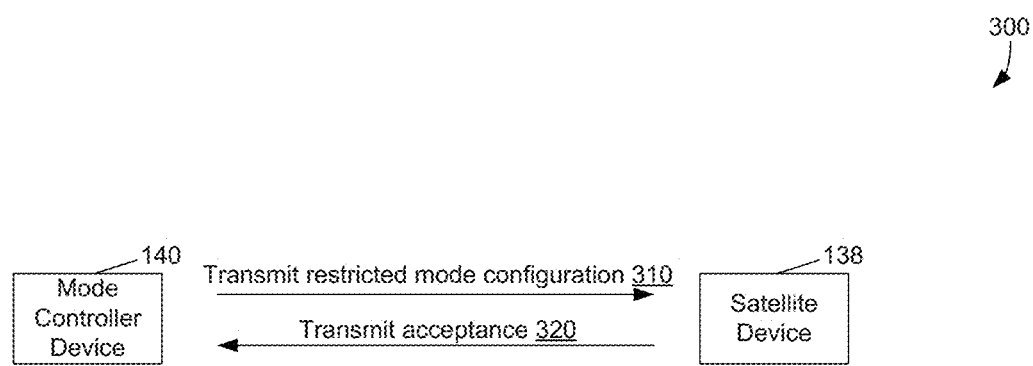
FIG. 3 is a system interaction diagram for configuring restricted mode configurations for a computing device and transmitting these configurations to the computing device directly.

FIG. 3 is a system interaction diagram 300 for configuring context-based restrictions for a computing device. As shown, mode controller device 140 and satellite device 138 may interact with each other to establish restricted mode configurations for satellite device 138.

At stage 302, mode controller device 140 transmits restricted mode configurations directly to satellite device 138. In contrast to the embodiments described with respect to FIG. 2, mode controller device 140 may not communicate with satellite device 138 via server device 110 or another intermediary device. In some embodiments, mode controller device 140 establishes a direct connection with satellite device 138 in order to transmit restricted mode configurations. For example, mode controller device 140 may initiate a peer-to-peer connection (e.g., Bluetooth, peer-to-peer Wi-Fi, etc.) with satellite device 138. Mode controller device 140 may be in physical proximity with satellite device 138 and establish a proximity-based connection with satellite device 138. Satellite device 138 receives the restricted mode configuration and transmits acceptance at stage 304.

Figure 4:
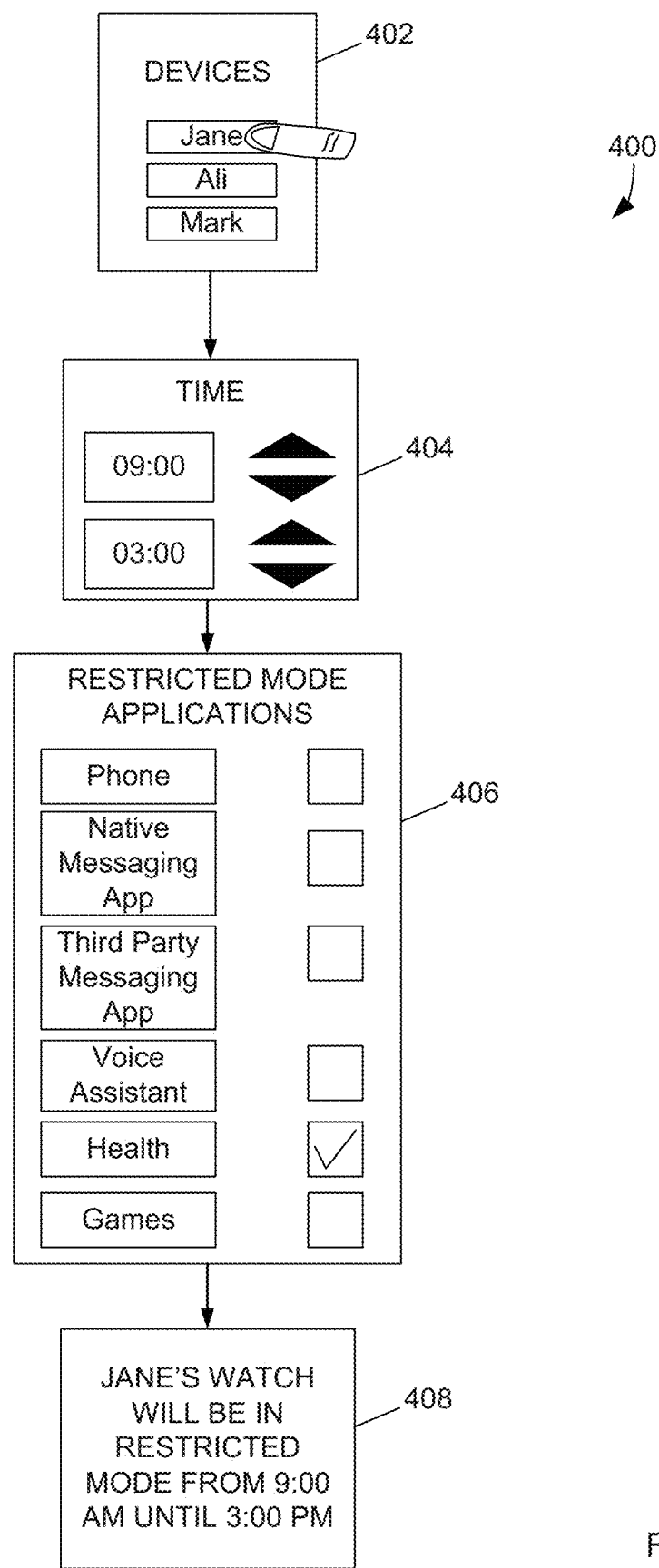
FIG. 4 shows a process for creating restricted mode configurations for a computing device.

FIG. 4 shows a set of user interface (UI) elements 400 that may be used for configuring context-based restrictions for a computing device. In some embodiments, mode controller device 140 (shown in FIG. 1) may present UI elements 400 to the user to create a restricted mode configuration for satellite device 138 (shown in FIG. 1). In some embodiments, these UI elements may appear on a single display screen or across multiple screens of management application 145 of mode controller device 140.

In some embodiments, mode controller device 140 may be configured to enforce restricted mode configurations in asynchronous or synchronous ways. For example, a parent may create a restricted mode configuration at mode controller device 140 and then send it to satellite device 138 (e.g., via server device 110). This process can be termed asynchronous because the creation process at mode controller device 140 happens at an earlier time than the implementation of the configuration at satellite device 138.

Mode controller device 140 may also be configured to perform synchronous restricted mode configuration for satellite device 138. In some embodiments, mode controller device 140 establishes a pairing relationship with satellite device 138 to synchronously create the restricted mode configuration at satellite device 138, as described further below.

In an asynchronous process, management application 145 of mode controller device 140 displays UI elements 400 for the user (e.g., a parent). As shown in FIG. 4, UI element 402 shows a list of devices. In one embodiment, UI element 402 may identify devices by device name or by device nicknames given by a parent (e.g., "son's phone", "daughter's watch"). In another embodiment, UI element 402 may depict a list of contacts that are each associated with a particular device. As shown in UI element 402, the user selects one contact name, "Jane", from the list. Management application 145 may also display UI element 404. In UI element 404, management application 145 displays time selection controls enabling the parent to set a start and end time for the restricted mode to be implemented for Jane's device.

Management application 145 may also display UI element 406 where the parent can select any exceptions to the restricted mode configuration. In other words, the parent can select any functions that the parent wishes to permit satellite device 138 to continue executing during restricted mode. For example, a parent may wish to permit satellite device 138 to continue running background processes, or continue receiving communications from other devices without notifying the child using satellite device 138, or the like. As shown in UI element 406, the parent selects a health-related user application to continue executing on satellite device 138 even during restricted mode. The child may have certain health concerns that require monitoring of vital statistics or body chemistry necessitating that the health-related user application continue to execute its functions (e.g., where satellite device 138 is a wearable device of the child).

After configuring any exceptions to the restricted mode configuration, the parent may receive a confirmation message from management application 150. For example, the message may state that "Jane's watch will be in restricted mode from 9:00 AM until 3:00 PM" as shown at UI element 408. Management application 145 generates the restricted mode configuration (e.g., a data structure stored in a configuration file) and transmits it to satellite device 138. As mentioned earlier, the process just described is an asynchronous process to enforce restricted mode configurations.

Mode controller device 140 may also create restricted mode configurations for satellite device 138 using synchronous processes. For example, mode controller device 140 may establish a pairing relationship with satellite device 138. With the pairing relationship, mode controller device 140 may view user interfaces of satellite device 138. These user interfaces of satellite device 138 may also present the UI elements 400 that are illustrated in FIG. 4. In other words, a user of mode controller device 140 may be able to remotely configure context-based restrictions for satellite device 138.

A parent may use mode controller device 140 but also other satellite devices. The parent may pair mode controller device 140 with one of the parent's satellite devices. Pairing with the satellite device may enable the parent to directly control that satellite device. For example, the parent may be able to view displays or user interfaces of her own satellite device (e.g., a smartwatch), on her mode controller device 140 (e.g., a smartphone). In this example, each of mode controller device 140 and the parent's satellite device is associated with the parent's user account. But the parent may also be able to switch, at mode controller device 140, from the parent's satellite device to the child's satellite device 138. The parent may be able to view user interfaces of satellite device 138 on mode controller device 140. The parent may use this functionality to create restricted mode configurations using applications of satellite device 138. For example, management application 150 of satellite device 138 may present the same UI elements 400 in this synchronous process that management application 145 of mode controller device 140 displayed earlier in the asynchronous configuration process.

In some embodiments, the parent may be able to control applications of satellite device 138 in ways that the child cannot. For example, the parent can use management application 150 of satellite device 138 to create restricted mode configurations (when mode controller device 140 is paired with satellite device 138) but the child may not be able to do so. This is because the parent's account may have more or higher-level permissions. These permissions may enable the parent to remotely configure satellite device 138 using applications or interfaces of the satellite device 138 as they are viewed and controlled from mode controller device 140.

In addition, the parent may be able to modify a restricted mode configuration while it is active on satellite device 138. The child may be unable to modify the restricted mode configuration without performing a mode exit process. But the parent may be able to switch, using mode controller device 140, to satellite device 138 and directly modify a restricted mode configuration.

FIG. 5 is a calendar view 500 indicating various days and times during which a person can configure context-based restrictions for a computing device.

In some embodiments, a parent may wish to set up a recurring restricted mode configuration for a child. For example, a parent may wish to enforce restricted mode on the child's satellite device (e.g., satellite device 138, shown in FIG. 1) for every weekday of the week, during the hours of 9:00 AM to 3:00 PM, when the child is in school. Accordingly, FIG. 5 shows day view 502, day view 504, day view 506, day view 508, day view 510, day view 512, and day 514 (e.g., for Monday-Sunday respectively). In some embodiments, calendar view 500 is displayed instead of or in addition to stage 404 shown in FIG. 4. A parent may use calendar view to highlight each day view and select restricted mode for each weekday. FIG. 5 also shows that day view 512 and 514 show no restricted mode configuration. For example, a parent may not set restricted mode for a child on weekend days when the child is not at school.

In some embodiments, the child may wish to request a modification to a recurring restricted mode configuration. For example, a parent may import or receive a school calendar for the child. The school calendar may indicate that Thursday, represented by day view 508, is a school holiday. In other words, the child may not be at school on that day and restricted mode may not be required. Due to the school holiday, the child may request that restricted mode be removed for Thursday. In response, the parent may modify the restricted mode configuration at mode controller device 140.

Similarly, the parent may generate different restricted mode configurations according to the usage context. The parent may generate one restricted mode configuration for a school usage context (e.g., during 9:00 AM to 3:00 PM) in which all functionality is disabled on satellite device 138. The parent may generate another restricted mode configuration for an extracurricular usage context. For example, for an after school music class from 3:00 PM to 4:00 PM, the parent may generate a second restricted mode configuration that disables all functionality except for a music or recording application that the child needs to practice her music lessons.

Figure 6A:
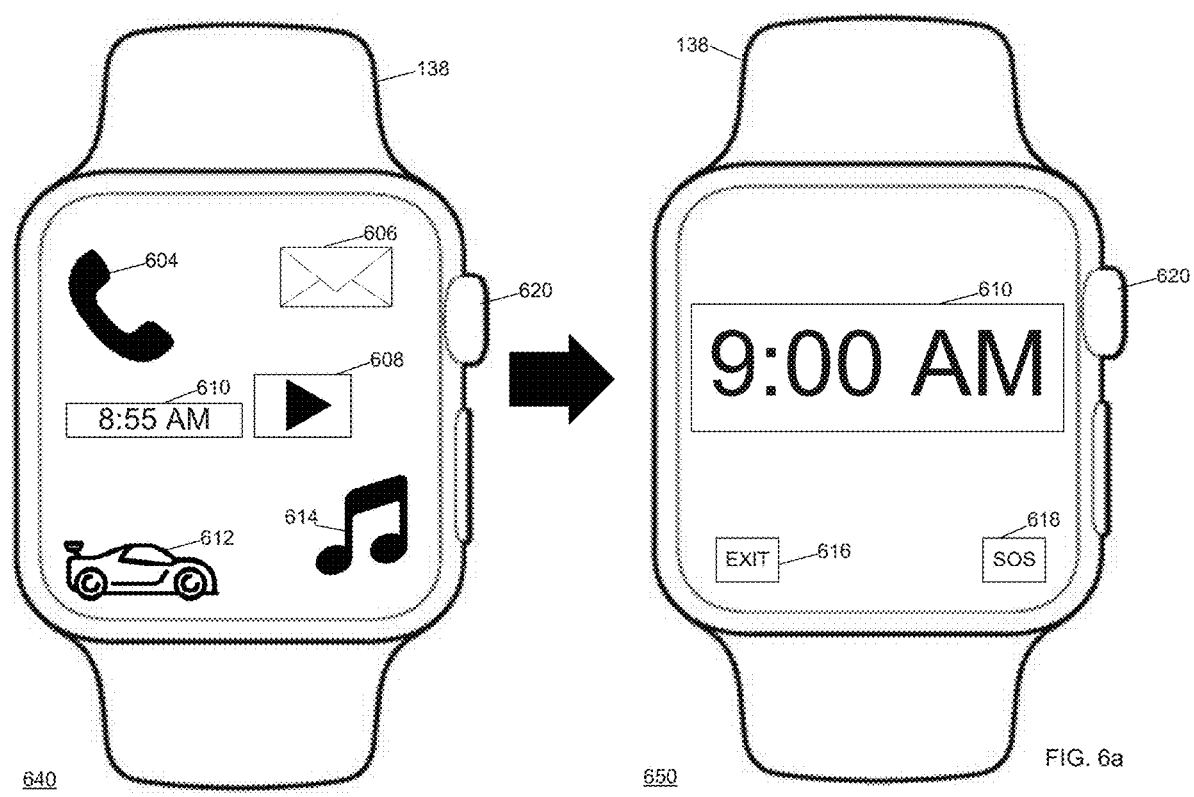
FIGS. 6*a*, 6*b*, and 6*c* show a number of display stages of a satellite device that is configured with restricted mode configurations.
Figure 6B:
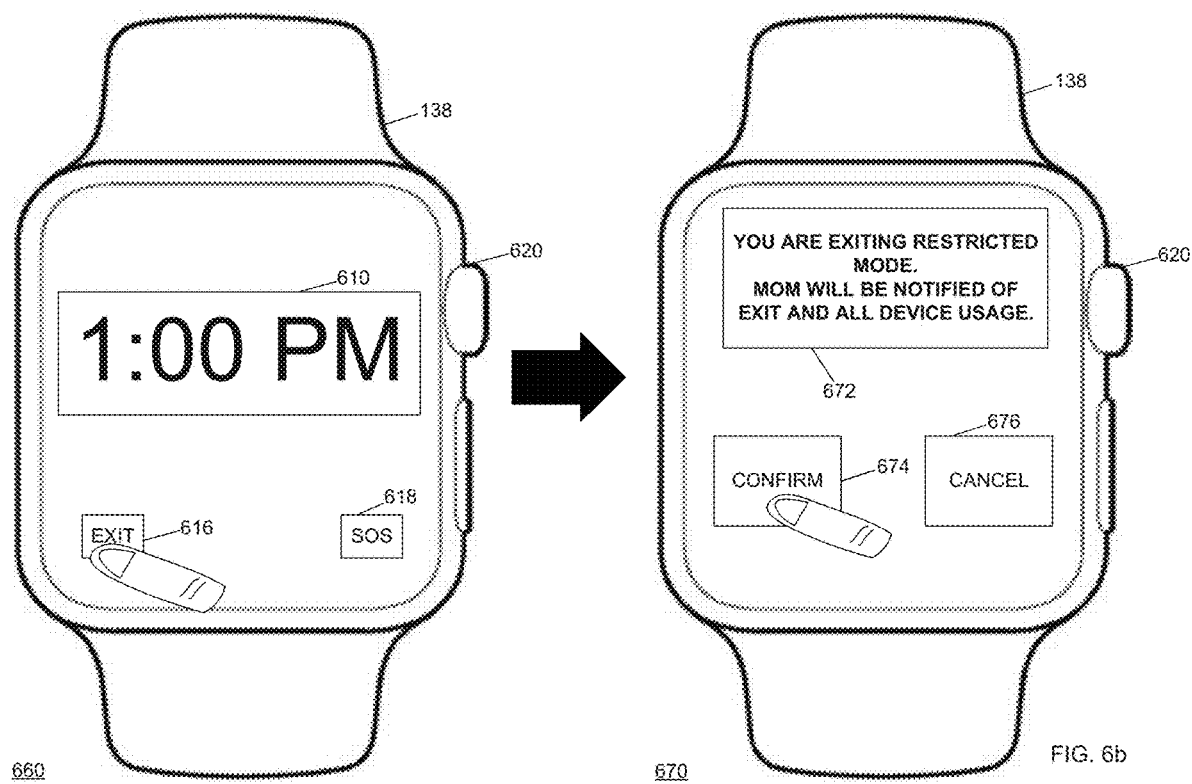
Figure 6C:
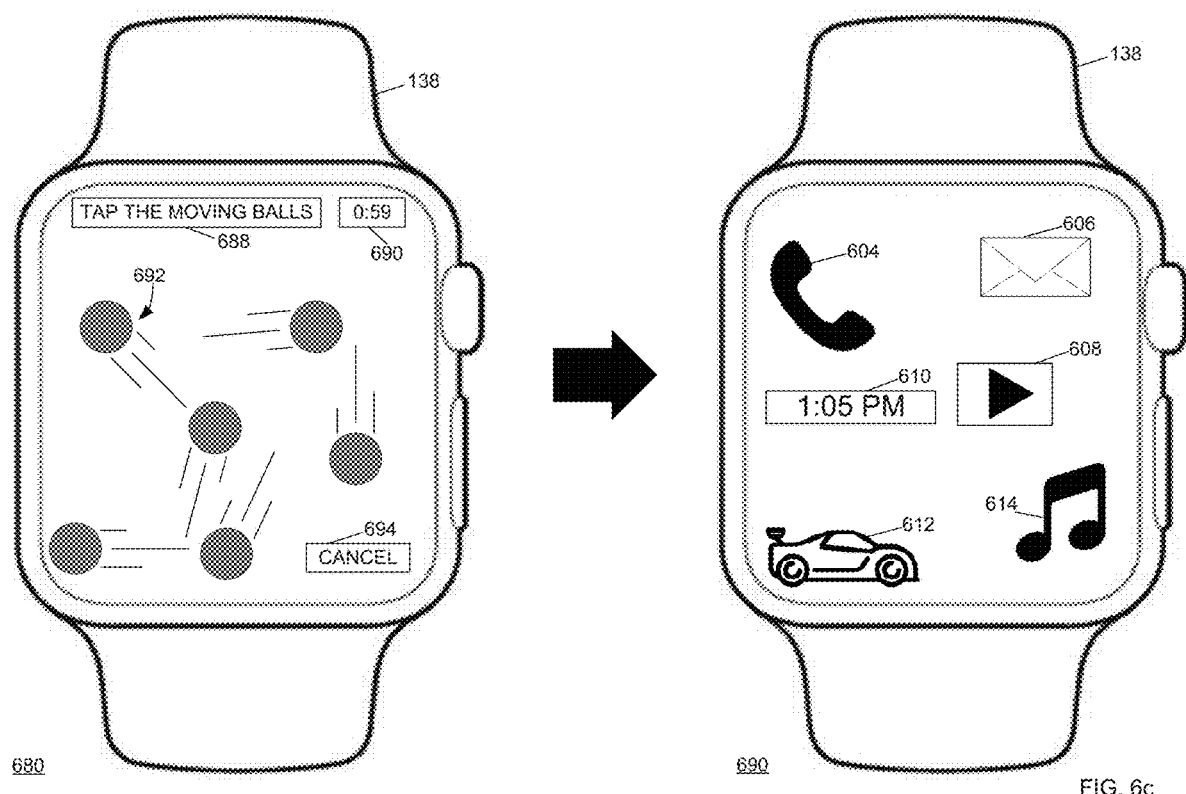

FIGS. 6a-6c show a number of display stages 640-690 of a satellite device that is configured with restricted mode configurations. More specifically, FIGS. 6a-6c illustrate satellite device displays as the satellite device enters and exits restricted mode.

As shown in FIG. 6a, stage 640 shows the display of satellite device 138 (similar to satellite device 138 shown in FIG. 1) before a restricted mode configuration is in effect. In some embodiments, stage 640 may depict a child's satellite device (e.g., a wearable computing device or other mobile computing device) in a default operational mode. Stage 640 depicts a variety of display icons that each represent user applications or other software that is executable on satellite device 138. Stage 640 shows display icons representing telephone application 604, mail application 606, video application 608, clock application 610, gaming application 612, and music application 614. In some embodiments, a display icon may represent a group of applications. Stage 640 also shows that satellite device 138 includes a hardware control 620 (e.g., a button, dial, switch, or the like).

Each application of satellite device 138 may have different features that can be disabled or limited by a restricted mode configuration. For example, telephone application 604 may provide the ability to make and receive telephone calls using satellite device 138. Telephone application 604 may output audio notifications (e.g., ringing sounds) when a telephone call is incoming. Telephone application 604 may update the display that is shown in stage 604 to a display interface that shows an identifier and/or photo of an incoming caller. Telephone application may be configured to show notifications in the form of banners, badges, modal windows, or the like. Similarly, mail application 606 may be configured to display new mail notifications. Video application 608 may be configured to display notifications. Gaming application 612 may be configured to display specialized notifications that indicate, for example, when a new online gaming player is available with whom a user of satellite device 138 can play a game. Music application 614 may be configured to play music, show a small display or no display but display specialized controls (e.g. just volume or shuffle controls rather than a full display interface).

Each display icon may be interactive in various ways. In some embodiments, satellite device 138 can include a touch-sensitive surface. For example, each display icon may be tappable or clickable to access a first functionality. The touch-sensitive surface can process multiple simultaneous points of input, including processing data related to the pressure, degree or position of each point of input. Each display icon may respond to gestures with multiple fingers, including pinching and swiping to enable other functionalities. The touch-sensitive surface itself may be swiped to view a different display interface (e.g., with additional application icons or other displays).

In some embodiments, satellite device 138 receives a restricted mode configuration from controller device 140 at stage 640. For example, the current time at stage 640 may be 8:55 AM. At that time, a parent may use controller device 140 to transmit a restricted mode configuration to a child's satellite device 138. The restricted mode configuration may be configured to activate at 9:00 AM and remain in effect until 3:00 PM. For example, the 9:00 AM-3:00 PM time period may be the time that the child is in school and the parent may wish to restrict the child's use of satellite device 138 during that time period. In other embodiments, the parent may have established restricted mode configurations for satellite device 138 at an earlier time. The parent or guardian may schedule restricted mode for a child's satellite device 138 for an entire work week. For example, the parent may wish to enforce restricted mode on the child's satellite device 138 from Monday through Friday on a certain week, every day from 9:00 AM to 3:00 PM. Accordingly, at the designated time, satellite device 138 will automatically enter restricted mode.

At the time indicated by the restricted mode configuration, satellite device 138 automatically enters restricted mode. In some embodiments, satellite device 138 may display a warning message at a particular time before (e.g., 5 minutes before) restricted mode goes into effect. In some embodiments, satellite device 138 may be configured to display nothing or only a wallpaper or generic image that may not respond to user interaction. In other embodiments, satellite device 138 automatically switches to stage 650 as shown in FIG. 6. When in restricted mode, satellite device 138 may be configured to display certain display icons. For example, stage 650 depicts clock application icon 610, similar to clock application icon 610 that was displayed in stage 640. Clock application icon 610 may remain the same size as in stage 640. As shown in stage 650, clock application icon 610 appears larger than in stage 640 and occupies a greater screen area to indicate a state of satellite device 138 that is restricted to little or no functionality.

Stage 650 also shows mode exit process control 616 and emergency communication icon 618. In some embodiments, the display screen of satellite device 138 may become completely non-interactive or unresponsive except for a user's ability to interact with mode exit process control 616 and emergency communication icon 618. In other embodiments, mode exit process control 616 may be the only visible icon, or other icons may display but mode exit process control 616 may be the only one that responds to user interaction.

In some embodiments, a number of application interaction features become inactive or unavailable once restricted mode is in effect. As shown in stage 650, several display icons disappear from the display of satellite device 138. In some embodiments, the display icons for telephone application 604, mail application 606, video application 608, gaming application 612, and music application 614 are removed from the display of satellite device 138. In other embodiments, the display icons for the abovementioned applications still appear on the display of satellite device 138 but the restricted mode configuration causes them to become non-interactive. For example, the icon for telephone application 604 may still display but tapping it (e.g., on a touch-sensitive display) may cause no apparent change to the display.

Satellite device 138 may be configured to determine additional actions for any actively running applications to maintain an expected user experience despite changes caused by a restricted mode configuration. For example, a child may be in a text message conversation at the onset of restricted mode. The recipient of the child's text messages may not be aware of the onset of restricted mode. Accordingly, satellite device 138 may be configured to set a default outgoing message for any text message conversation participants. Participants in a telephone call with the child may receive an automatically recorded message that the child's device is now in a restricted mode. Gaming application 612 (shown in FIG. 6a) may be configured to automatically pause and resume at the end of restricted mode at the same point in the game. Music application 614 may be configured to pause output of a currently playing audio file and resume at the same point in the file at the end of restricted mode, and so on. In an alternative embodiment, satellite device 138 may be configured by the restricted mode configuration to provide the child a reminder that restricted mode will soon begin (e.g., in five minutes) so that the child can manually pause or end any activity and minimize any disruption caused by the start of restricted mode.

In still other embodiments, a subset of the displayed icons may disappear but others might continue to display and be usable or interactive, per the restricted mode configuration. For example, when the restricted mode configuration is enforced, icons for mail application 606, video application 608, gaming application 612, and music application 614 may disappear but the telephone application 604 icon may continue to display and be interactive for the user in case the user needs to make an emergency call. Such embodiments enable a user to still use satellite device 138 in a limited sense while enforcing a controlling user's desired restrictions. For example, restricted mode may disable all functions from satellite device 138 so that a child can focus on school work but still allow telephone calls so that the child can call parents or an emergency contact if necessary. The parent may be comfortable with telephone application 604 being active because even if it is available to the child, the child is unlikely to make telephone calls in a class period with a teacher present. Similarly, certain other applications may be required for a child's school work. For example, video application 608 may be necessary for a child to view a learning video for a certain school subject.

Moreover, restricted mode configurations may be applicable to certain functionality at satellite device 138 for shorter periods than an entire day. For example, a parent may enable specific applications based on specific time periods for the child. As in the example of video application 608, knowing the child's school schedule, the parent may enable certain applications for certain school periods, based on the child's needs, whereas other applications (e.g., gaming application 612) may remain disabled for the duration of the school day.

Mode exit process control 616 may be configured to enable a user of satellite device 138 to exit the enforced restricted mode. In some embodiments, mode exit process control 616 may be the only icon that displays on satellite device 138. In other embodiments, other icons or controls may be displayed but mode exit process control 616 may be the only icon or control that responds to input. In other embodiments, no specific mode exit process icon may be displayed but the entire display screen displays a default screen (e.g., a black screen or generic wallpaper image) that, when tapped, initiates a mode exit process for the user to attempt to exit restricted mode. In still other embodiments, all display icons (e.g., icons for telephone application 604, mail application 606, etc.) may be displayed. However, when a user interacts with any application's display icon, a mode exit process is initiated, instead of the application's default display or behavior.

Stage 660, as shown in FIG. 6b, shows a user attempting to exit restricted mode by selecting mode exit process control 616. For example, the time may be later in the afternoon (e.g., 1:00 PM) when the child is still in school and restricted mode is still active, but the child wishes to exit restricted mode. Selecting mode exit process control 616 at stage 660 causes satellite device 138 to transition to stage 670.

Stage 670 displays warning notification 672, confirmation control 674, and exit cancel control 676. In some embodiments, warning notification 672 may indicate to a user of satellite device 138 that the attempt to exit restricted mode will be reported to the user that imposed the restricted mode configuration on satellite device 138. For example, a child using satellite device 138 will be warned that exiting restricted mode will be reported to her mother, the parent that imposed the restricted mode configuration. Stage 670 shows exit cancel control 676 which, if selected, may revert satellite device back to restricted mode as shown in stage 660. In some embodiments, selecting the exit cancel control 676 after initially selecting mode exit process control 616 may not result in any notification to a user of mode controller device 140 (e.g., a parent).

However, stage 670 shows that the child proceeds to select confirmation control 674. Selecting confirmation control 674 may cause satellite device 138 to enter a mode exit process that, if completed, will disable the restricted mode and revert satellite device 138 back to its default operational mode with all functionality available for use.

In some embodiments, selecting confirmation control 674 causes satellite device 138 to display a mode exit process as seen in stage 680 that must be completed on the display screen. As noted above, the mode exit process is designed to require a child to conspicuously focus on and also interact with the satellite device 138 for a noticeable length of time to make it evident that the child is attempting to exit restricted mode.

Stage 680 shows a mode exit process display that requires the user to accurately tap the screen several times. For example, a child may be required to tap on multiple moving objects (e.g., moving balls) on the screen several times for a period of time. Stage 680 shows a text label 688, a timer 690, a plurality of moving objects that require interaction (e.g., touch input), and an exit cancel control 694. Exit cancel control 694 may be similar to exit cancel control 676 (shown in stage 670 of FIG. 6b) in that both may result in satellite device 138 reverting to restricted mode. In one embodiment, using either exit cancel control may result in no notification to a parent.

As shown in stage 680, the user must complete the mode exit process according to a certain period of time. For example, the user may need to tap all the moving objects within a certain time limit (e.g., 1 minute) or restricted mode may be reactivated. As another example, the user may need to continue tapping each moving object for the length of time with at least a certain level of accuracy before the restricted mode can be exited.

In other embodiments, hardware control 620 may also be used to exit restricted mode. For example, a parent may specify a particular sequence of movements for hardware control 620 that will result in the restricted mode being exited. For example, where hardware control 620 is a watch crown, the parent may specify that hardware control 620 be turned clockwise and/or counterclockwise by precise amounts in a particular order before restricted mode can be exited. In another embodiment, management application 150 of satellite device 138 may automatically generate a random sequence of turn movements that a child must perform in order to exit restricted mode. Instructions on how to turn the watch crown may be contemporaneously displayed on the display of satellite device 138.

Additionally, the parent may configure different mode exit processes in the restricted mode configuration, depending on the usage context. For example, a mode exit process such as that shown in stage 680 may be configured for an in-class instruction period context where the child's prolonged interaction with satellite device 138 to exit the restricted mode will likely be noticeable to a teacher. In an after school usage context, the child may be permitted to use satellite device 138 to, for example, view music clips required for music practice. In this latter context, the child may exit restricted mode more conveniently using the mode exit process of stage 680 without attracting notice, because a teacher may consider the child to be viewing music clips rather than trying to exit a restricted mode configuration. So a different mode exit process may be required for the abovementioned after-school context, such as a mode exit process that requires physically shaking satellite device 138 for a length of time before restricted mode will be exited.

In some embodiments, once the user successfully completes the mode exit process, satellite device 138 reverts to its default operational mode. As shown in stage 690, satellite device 138 reverts to displaying a number of application icons. Satellite device 138 may be configured to reactivate any features, background processes, functionalities, or behaviors that were deactivated during restricted mode. Moreover, exiting restricted mode may result in the user receiving any notifications that were received during restricted mode but were suppressed. As described above, if restricted mode was supposed to be in effect at this time, it may be reactivated after a certain interval (e.g., 5 minutes) or after a certain movement (e.g., "watch down"), or after a period of inactivity. Additionally, in each of the abovementioned embodiments of the mode exit process, the child is required to look at satellite device 138 for an extended length of time and conspicuously interact with hardware controls or touch-sensitive surfaces in order to complete the mode exit process.

Figure 7:
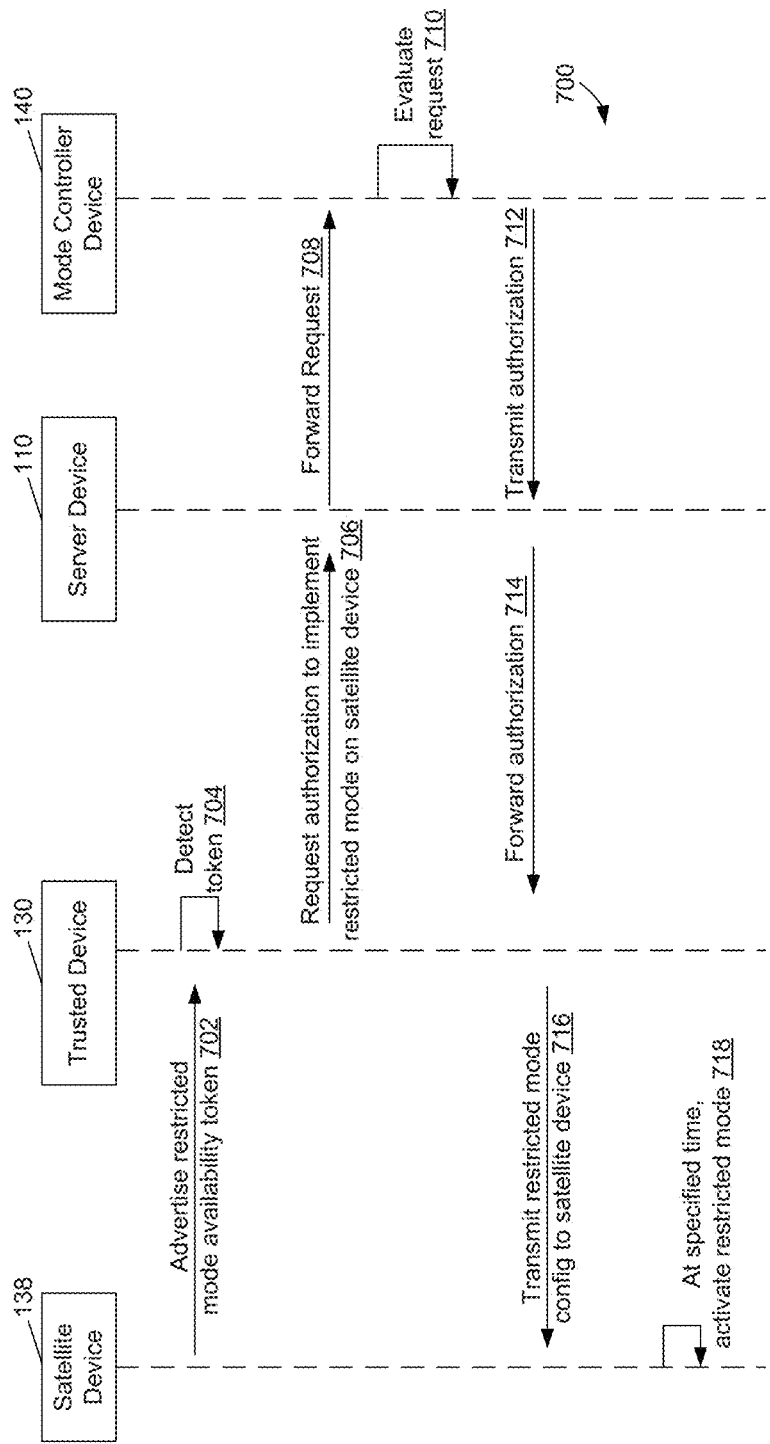
FIG. 7 is a system interaction diagram showing a trusted third party configuring a computing device with restricted mode configurations.

FIG. 7 is a system interaction diagram 700 showing a trusted third party configuring context-based restrictions for a computing device. In some embodiments, a user of mode controller device 140 may wish to delegate the ability to create restricted mode configurations for satellite device 138 for a limited time or limited purpose. For example, a parent may permit a child's teacher to create a restricted mode configuration for the child while the child is in school. A parent may configure a child's satellite device to be responsive to restricted mode configurations created by devices of other trusted individuals, such as the child's teacher.

In one embodiment, the child's satellite device 138 may electronically advertise its ability to receive restricted mode configurations and the teacher may use the teacher's device to detect the advertisement and proceed with creating and transmitting a restricted mode configuration. In other embodiments, the teacher may advertise the teacher's device as providing restricted mode configurations. The child's satellite device 138 may respond to the teacher device's advertisement by automatically accepting the restricted mode configuration or notifying the child to voluntarily enter restricted mode. A first teacher may be able to enforce a first restricted mode configuration that is specific to the first teacher's instruction period while a second teacher enforces a second restricted mode configuration for the second teacher's instruction period.

As shown in FIG. 7, satellite device 138 first advertises its availability for restricted mode configuration at step 702. For example, a child's satellite device may be in a classroom in proximity to a teacher's device. The child's satellite device 138 may broadcast a restricted mode availability token that may be configured to be interpretable by trusted device 130 (e.g., the teacher's device). At step 704, trusted device 130 detects the restricted mode availability token.

A user of trusted device 130 (e.g., a teacher) may wish to enforce restricted mode on the advertising satellite device 138. The user of trusted device 130 may require authorization from the parent using mode controller device 140. In some embodiments, the teacher has prior authorization from the parent using mode controller device 140 to enforce restricted mode configuration on satellite device 138. In other embodiments, the teacher first uses trusted device 130 to request authorization to implement restricted mode on satellite device 138, as shown at step 706. More specifically, trusted device 130 communicates to server device 110 an authorization request to implement restricted mode configuration for satellite device 138. The authorization request may include details of the restricted mode configuration, the targeted satellite device 138, the duration of restricted mode, and one or more identifiers of the teacher using trusted device 130.

In some embodiments, and as shown at step 708, server device 110 forwards the request to mode controller device 140. In some embodiments, mode controller device 140 may be configured to evaluate, at step 710, the authorization request from trusted device 130. For example, the parent may have previously met with the teacher and authorized the teacher to impose restricted mode configurations on the child's satellite device. On receiving the authorization request, the parent may compare the request with the parent's prior agreement with the teacher. The parent may determine whether the authorization request meets the parent's expectation in terms of the length of restricted mode on the child's device, the type of restrictions, and the like.

The parent may approve the authorization request and transmit an authorization approval message to server device 110, at step 712. In some embodiments, the authorization approval message may include an authorization token that mode controller device 140 creates for trusted device 130 to use when transmitting restricted mode configurations to satellite device 138. Server device 110 may be configured to forward the authorization approval message with the authorization token to trusted device 130 at step 714. Trusted device 130 may be able to provide the authorization token received from mode controller device 140 to satellite device 138 so that satellite device 138 recognizes trusted device 130 as authorized and accepts restricted mode configurations from satellite device 138.

Trusted device 130 receives the authorization approval message and, at step 716, transmits a restricted mode configuration to satellite device 138. In some embodiments, satellite device 138 verifies (e.g., by evaluating the authorization token) that trusted device 130 is authorized to transmit restricted mode configurations to satellite device 138. At the time specified in the restricted mode configuration received from trusted device 130, satellite device 138 activates the specified restricted mode.

In some embodiments, trusted device 130 may be configured to receive particular mode exit and feature usage history reports that are specific to the restricted mode configurations set by the user of trusted device 130. For example, a teacher of the child may set a restricted mode configuration for the teacher's own instruction period of one hour of the school day. Accordingly, the teacher's trusted device 130 may receive reports of any attempts by the child to exit restricted mode or use of any features that occurred just during the teacher's one hour of instruction. This enables the teacher to review these reports at the end of the instruction period and address the behaviors with the child, rather than needing to address each mode exit attempt in real time. The teacher may not receive mode exit and feature usage reports for any other time period.

In some embodiments, satellite device 138 and trusted device 120 may establish a trusted relationship that does not require server device 110. For example, the child or the child's parent may have previously configured the child's satellite device 138 to accept any restricted mode configurations from a teacher's trusted device 120. Accordingly, trusted device 120 may receive the restricted mode availability token at step 704 and immediately skip to 716 and transmit a restricted mode configuration created by the teacher. Satellite device 138 may be configured to accept the restricted mode configuration and, at the specified time, activate restricted mode without further verification from mode controller device 140 or server device 110.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 8:
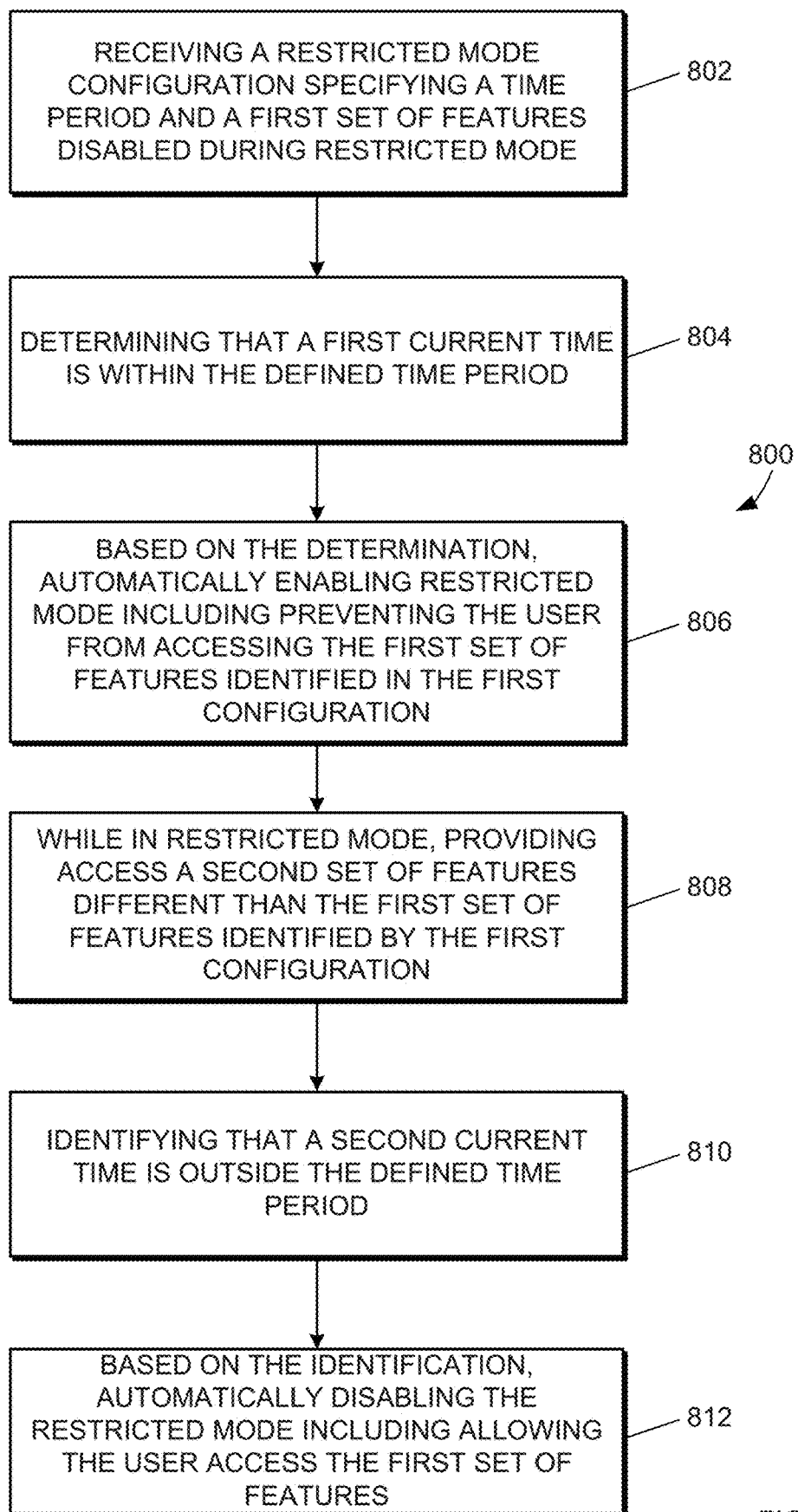
FIG. 8 is a flow diagram showing another process used by a computing device to enforce context-based restrictions on itself.

FIG. 8 is a flow diagram showing an example process 800 for configuring context-based restrictions for a computing device. For example, process 800 may be performed by satellite device 138 to receive and implement restricted mode configurations.

As described above with respect to FIG. 1, satellite device 138 may be included in device group 180 with mode controller device 140 such that controller mode device 140 can be used to implement restricted mode configurations on satellite device 138. In addition, a parent may create a user account family that includes the parent's user account with permissions to generate restricted mode configurations and implement those configurations on a child's satellite device. The parent may configure the user account family such that any used with the child's own user account becomes a satellite device. In some embodiments, the child's satellite device can receive and apply restricted mode configurations only from a device that is signed in with the parent's user account.

In some embodiments, satellite device 138 receives a restricted mode configuration that specifies a context for a restricted mode. The restricted mode configuration may applicable to a context defined by a particular time, a particular location, or a combination of both time and location. For example, the restricted mode configuration may specify that a child's satellite device 138 enter restricted mode at a certain time of the day (e.g., school time, such as 9:00 AM to 3:00 PM), at a certain location (e.g., a school building), or when there is a combination of a particular time and location (e.g., enter restricted mode when at school during school hours but not, for example, when at home during those same hours).

Based on the context, the restricted mode configuration may define certain restrictions to be implemented on satellite device 138. For example, for a child in a school context, the restricted mode configuration may disable any applications that have video play features on the child's satellite device 138.

At step 802 of process flow 800, satellite device 138 may be configured to receive a first data message that may include a restricted mode configuration. In some embodiments, satellite device 138 may receive the first data message from server device 110. As described above, server device 110 may receive restricted mode configurations from mode controller device 140 and provide these to satellite device 138. In some embodiments, mode controller device 140 may encrypt these restricted mode configurations using a key that only satellite device 138 and mode controller device 140 have and server device 110 does not have. In other embodiments, satellite device 138 receives the first data message including restricted mode configurations directly from mode controller device 140. In these embodiments, the first data message may or may not be encrypted.

In some embodiments, satellite device 138 may be configured to decrypt the first data message. Satellite device 138 may be configured to determine the context specified in the restricted mode configuration. For example, the restricted mode configuration may specify a certain time of day. Accordingly, satellite device 138 may determine whether the current time corresponds to that time of day. As another example, the restricted mode configuration may specify a particular location as the appropriate context. Satellite device 138 may determine the specified location and evaluate whether the current location of satellite device 138 corresponds to the location specified in the restricted mode configuration.

In some embodiments, the restricted mode configuration may specify that the start time for satellite device 138 to enter restricted mode is immediate. In other words, satellite device 138 may be required to enter restricted mode as soon as the restricted mode configuration is received, regardless of the current time or location.

Additionally, the restricted mode configuration may specify features to be disabled, features to remain enabled, display behaviors, restrictions on notifications and alerts to the user, logging and reporting preferences (e.g., for mode exit attempts), scheduling details (e.g., the restricted mode configuration may be set to repeat every weekday of the week), or the like. As described above, parameters of the restricted mode configuration are set by a user of a second device (e.g., a parent using mode controller device 140) and remotely transferred and applied to satellite device 138, rather than being intrinsic to satellite device 138. A parent can set multiple restricted modes on a child's satellite device 138 during a particular day or over the course of several days.

The start time may also be scheduled at a certain time. As an example, restricted mode may be set to begin at 9:00 AM. The current time may be 8:00 AM. Accordingly, satellite device 138 will enter restricted mode in one hour. As another example, restricted mode may be set to begin at 9:00 AM but the current time may already be 9:30 AM. In this example, satellite device 138 may determine that the current time is after the scheduled start time and enter restricted mode immediately. Accordingly, and as shown at step 804, satellite device 138 determines that the current time lies within the defined time period of the restricted mode configuration.

Satellite device 138 automatically activates restricted mode if it determines that the current time is within the restricted mode configuration time period, as shown at step 806. Activating restricted mode causes the features of satellite device 138 specified in the restricted mode configuration received from mode controller device 140 to be disabled. In some embodiments, the child is unable to use the specified features unless the child first performs a mode exit process that conspicuously draws the child's attention for a particular length of time.

In some embodiments, while in the restricted mode, satellite device 138 may be configured to continue providing access certain features that are different from those features identified in the restricted mode configuration, as shown at step 808. For example, restricted mode configuration may disable text message notifications from all contacts but still permit text message notifications from emergency services. For example, local emergency personnel may send text messages warning of severe weather in the area. Satellite device 138 may be configured by the restricted mode configuration to permit notifications to the child regarding such messages. For example, the restricted mode configuration may configure a text messaging application on satellite device 138 to permit notifications that originate from emergency service contacts or messages that include particular content.

As another example, satellite device 138 may permit notifications from health-related applications. For example, satellite device 138 may be a wearable device that monitors certain vital statistics (e.g., blood pressure, heart rate, blood sugar, etc.). Where a certain vital statistic approaches a critical or concerning level, the health-related application may, by default, be configured to present a notification to the child to take certain actions or notify another party (e.g., the parent) regarding the concerning vital statistic levels. During restricted mode, the health-related application may be configured to continue presenting such notifications or communications to others even as other applications are disabled from presenting notifications or communicating with other devices.

In addition, the restricted mode configuration may permit notifications of communications from other devices to satellite device 138 to break through restricted mode if they are repeat attempts. For example, a parent may make a first telephone call attempt to satellite device 138 from, for example, mode controller device 140. This first call may be blocked due to restricted mode being active. However, a second consecutive telephone call from the same device within a threshold amount of time (e.g., 30 seconds) may break through restricted mode. Satellite device 138 may permit the second telephone call to present a notification on the display that the child can see and interact with to pick up the phone call or perform other actions (e.g., respond with a default text message or allow the phone call to go to voicemail). The restricted mode configuration may also permit repeated attempts of different communication types to break through. For example, a person's phone call may be followed soon after by a text message to the child. Satellite device 138 may block the telephone call but permit a notification of the text message if it arrives within a threshold time after the telephone call.

At step 810, satellite device 138 may be configured to determine that the current time is outside of the time period defined by the restricted mode configuration. In some embodiments, satellite device 138 may receive the restricted mode configuration and store the end time of the restricted mode. When the restricted mode end time arrives, satellite device 138 may automatically disable restricted mode as shown by step 812. Disabling the restricted mode lifts all specified restrictions and allows the child access to the previously disabled set of features.

Figure 9:
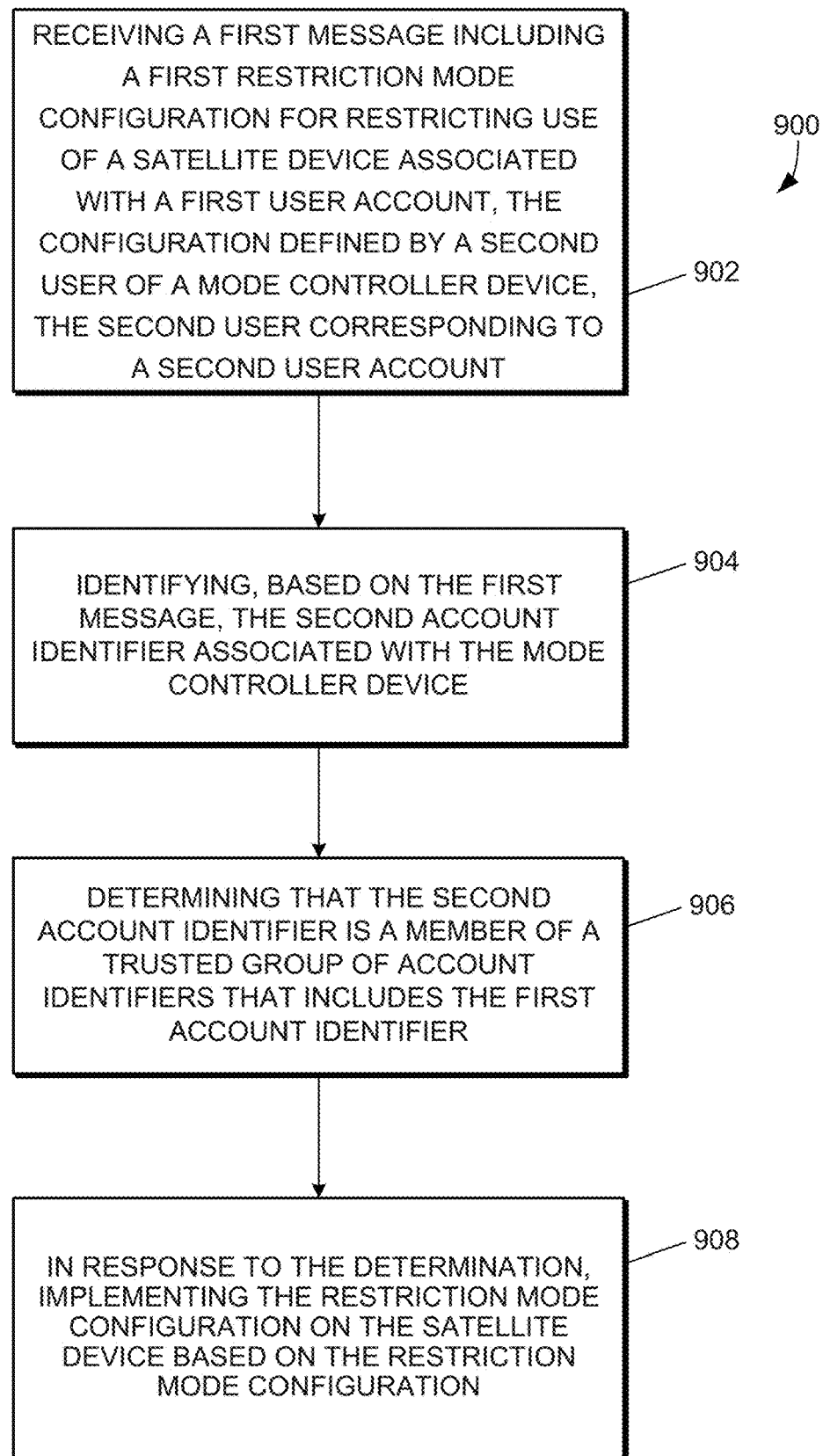
FIG. 9 is a flow diagram showing another process used by a computing device to determine whether a sender of restricted mode configurations is authorized to implement those configurations on the computing device.

FIG. 9 is a flow diagram showing another process 900 used by a computing device to enforce context-based restrictions on itself. For example, process 900 can be performed by a computing device (e.g., satellite device 138).

As described above with respect to FIG. 1, satellite device 138 may be included in device group 180 with mode controller device 140 such that mode controller device 140 can be used to implement restricted mode configurations on satellite device 138. In addition, a parent may create a user account family that includes the parent's user account with permissions to generate restricted mode configurations and implement those configurations on a child's satellite device. The parent may configure the user account family such that any device the child signs into with the child's own user account becomes a satellite device. In some embodiments, the child's satellite device can receive and apply restricted mode configurations only from a device that is signed in with the parent's user account.

Process flow 900 shows that, at step 902, satellite device 138 receives a data message including a restricted mode configuration for managing satellite device 138. As described above, a parent may implement restricted mode configurations for a child's satellite device. Satellite device 138 may receive the restricted mode configuration via server device 110, as described above with respect to FIG. 2. Satellite device 138 may also receive the restricted mode configuration in response to a request by satellite device 138. For example, a user may activate satellite device 138 for the first time after manufacture or purchase. The user (e.g., a child) may sign in to satellite device 138 with a user account. Satellite device 138 may determine that the signed-in user account belongs to a user that requires or has previously been designated as a user requiring restricted mode configuration for any of the user's devices.

Accordingly, satellite device 138 may request server device 110 to retrieve restricted mode configurations using a particular controller device identifier or parent's user account identifier associated with the signed-in user account of the child. In other embodiments, mode controller device 140 will detect (or server device 110 will inform mode controller device 140) that a child has signed on to satellite device 138 and the child's use should be managed using a restricted mode configuration. In still other embodiments, restricted mode configurations may be transmitted directly from mode controller device 140 through a direct connection between mode controller device 140 and satellite device 138 as described above with respect to FIG. 3.

In some embodiments, satellite device 138 determines that the restricted mode configuration originates from mode controller device 140 and is defined by a user of mode controller device 140. Satellite device 138 may be configured to identify, at step 904, based on the data message, an account identifier for the parent that is associated with mode controller device 140. In one embodiment, satellite device 138 may determine the originating device that transmitted the restricted mode configuration. This may be, for example, mode controller device 140. Having identified mode controller device 140, satellite device 138 may be configured to determine an account identifier of a user of mode controller device 140.

Satellite device 138 may be configured to determine, at step 906, that the account identifier is a member of a trusted group of account identifiers. For example, satellite device 138 may recognize the account identifier of a parent as being part of the user account family described above as being set up by the parent. Satellite device 138 may also recognize that the account identifier has associated permissions that enable it to apply restricted mode configurations to satellite device 138. Satellite device 138 may further recognize the account identifier to belong to a trusted group of account identifiers (e.g., a family of users) that also includes the user account identifier currently being used to operate satellite device 138.

In response to determining that the account identifier associated with the received restricted mode configuration is authentic or authorized, satellite device 138 may be configured, at step 908, to automatically apply the restricted mode configuration. In one embodiment, satellite device 138 implements the restricted mode configuration to disable one or more features of the satellite device in a particular context (e.g., during a time of day when the child is in school).

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from specific and legitimate sources to configure context-based restrictions for a computing device. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital statistics measurements, medication information, exercise information), date of birth, or any other personal information.

The restricted mode configurations that may be specified by a user, (e.g., configurations based on time, geolocation, device environment/condition, etc.), as well as any communications corresponding to those configurations, may be encrypted in an end-to-end encrypted manner as described herein. In this way, the configuration data is only accessible by the devices associated with the user (e.g., and/or children) and not by a server (e.g., server 110), thereby protecting user privacy.

The present disclosure recognizes that the use of such personal information data, in the present technology, can be used to the benefit of users. For example, the personal information data can be used to configure context-based restrictions for a computing device. Accordingly, use of such personal information data enables users to more conveniently configure context-based restrictions for a computing device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of configuring context-based restrictions for a computing device, the present technology can be configured to allow users to select to "opt in" or "opt out" of participation in the collection of personal information data during registration for services or anytime thereafter. In another example, users can select not to provide device data or account data for configuring context-based restrictions for a computing device. In yet another example, users can select to limit the length of time device and account data is maintained or entirely block the development of restricted mode configurations. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the application for purposes of configuring context-based restrictions for a computing device.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, restricted mode configurations can be delivered based on aggregated non-personal information data or a bare minimum amount of personal information, such as the content being handled only on the user's device or other non-personal information available to the restricted mode configuration creator devices.

Example System Architecture

Figure 10:
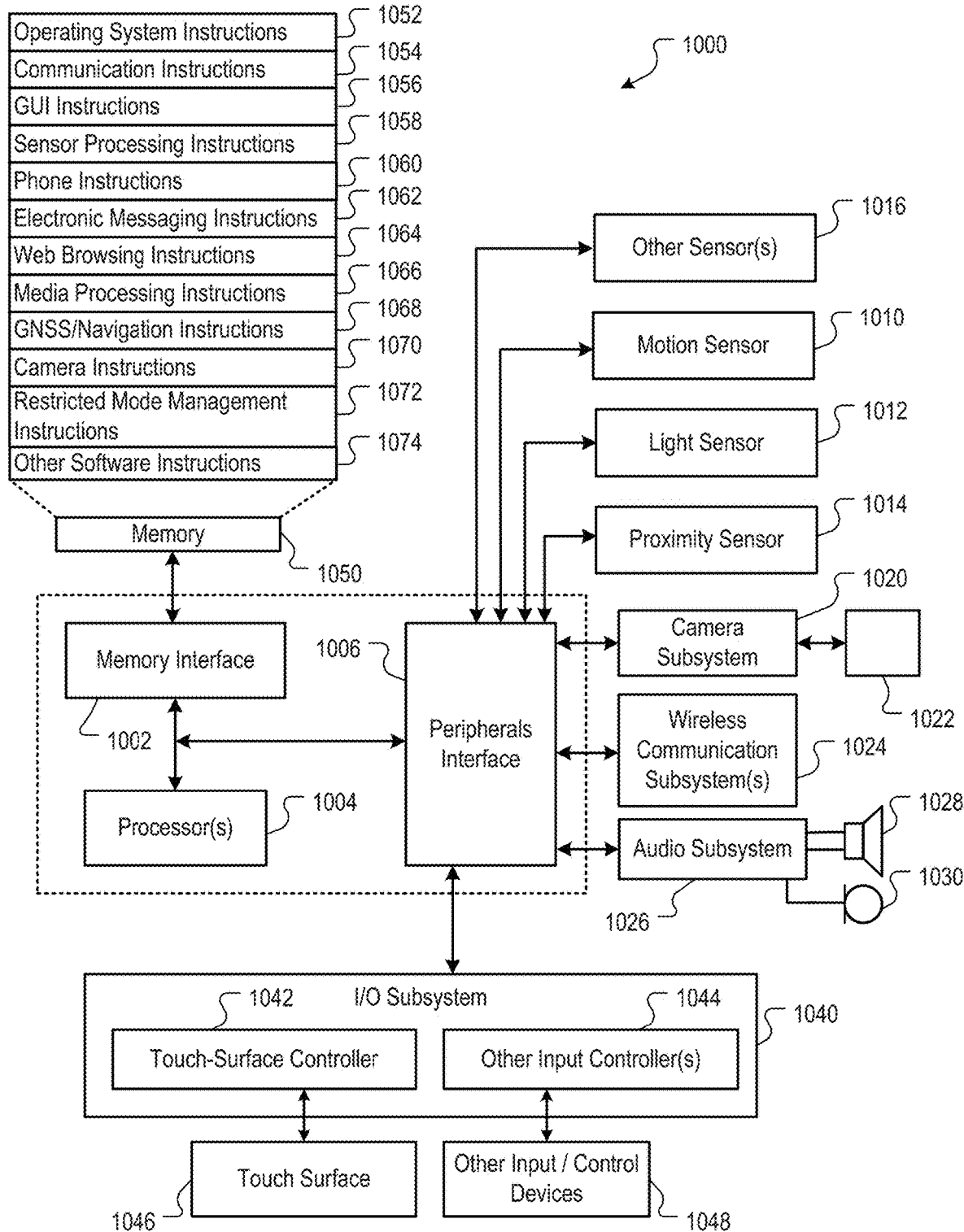
FIG. 10 is a block diagram of an example computing device that can implement the features and processes of FIGS. 1-9.

FIG. 10 is a block diagram of an example computing device 1000 that can implement the features and processes of FIGS. 1-9. The computing device 1000 can include a memory interface 1002, one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the computing device 1000 can be coupled by one or more communication buses or signal lines.

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate orientation, lighting, and proximity functions. Other sensors 1016 can also be connected to the peripherals interface 1006, such as a global navigation satellite system (GNSS) (e.g., GPS receiver), a temperature sensor, a biometric sensor, magnetometer or other sensing device, to facilitate related functionalities.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips. The camera subsystem 1020 and the optical sensor 1022 can be used to collect images of a user to be used during authentication of a user, e.g., by performing facial recognition analysis.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the computing device 1000 is intended to operate. For example, the computing device 1000 can include communication subsystems 1024 designed to operate over a GSM network, a GPRS network, an EDGE network, a Wi-Fi or WiMax network, and a Bluetooth™ network. In particular, the wireless communication subsystems 1024 can include hosting protocols such that the device 100 can be configured as a base station for other wireless devices.

An audio subsystem 1026 can be coupled to a speaker 1028 and a microphone 1030 to facilitate voice-enabled functions, such as speaker recognition, voice replication, digital recording, and telephony functions. The audio subsystem 1026 can be configured to facilitate processing voice commands, voiceprinting and voice authentication, for example.

The I/O subsystem 1040 can include a touch-surface controller 1042 and/or other input controller(s) 1044. The touch-surface controller 1042 can be coupled to a touch surface 1046. The touch surface 1046 and touch-surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a pressing of the button for a first duration can disengage a lock of the touch surface 1046; and a pressing of the button for a second duration that is longer than the first duration can turn power to the computing device 1000 on or off. Pressing the button for a third duration can activate a voice control, or voice command, module that enables the user to speak commands into the microphone 1030 to cause the device to execute the spoken command. The user can customize a functionality of one or more of the buttons. The touch surface 1046 can, for example, also be used to implement virtual or soft buttons and/or a keyboard.

In some implementations, the computing device 1000 can present recorded audio and/or video files, such as MP3, AAC, and MPEG files. In some implementations, the computing device 1000 can include the functionality of an MP3 player, such as an iPod™.

The memory interface 1002 can be coupled to memory 1050. The memory 1050 can include high-speed random-access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as Vx Works.

The operating system 1052 can include instructions for handling basic system services and for performing hardware dependent tasks. In some implementations, the operating system 1052 can be a kernel (e.g., UNIX kernel). In some implementations, the operating system 1052 can include instructions for performing voice authentication. For example, operating system 1052 can implement the features for active change detection for geospatial entities as described with reference to FIGS. 1-9.

The memory 1050 can also store communication instructions 1054 to facilitate communicating with one or more additional devices, one or more computers and/or one or more servers. The memory 1050 can include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GNSS/Navigation instructions 1068 to facilitate GNSS and navigation-related processes and instructions; and/or camera instructions 1070 to facilitate camera-related processes and functions.

The memory 1050 can store software instructions 1072 to facilitate other processes and functions, such as the processes and functions for active change detection for geospatial entities as described with reference to FIGS. 1-9.

The memory 1050 can also store other software instructions 1074, such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions of the computing device 1000 can be implemented in hardware and/or in software, including in one or more signal processing and/or application specific integrated circuits.

What is claimed is:

1. A method comprising:
    obtaining, by an electronic device, a first set of motion data collected by a motion sensor comprised in the electronic device;
    wherein the first set of motion data corresponds to a first gesture or first movement detected by the motion sensor;
    based on the first set of motion data, determining whether a first triggering condition for activating a restricted mode for the electronic device has been detected;
    responsive to determining that the first triggering condition for activating the restricted mode for the electronic device has been detected:
        configuring the electronic device to operate in the restricted mode,
        wherein while the electronic device is operating in the restricted mode, a first user application executes in a fully functional mode while a second user application is disabled.

2. The method of claim 1, wherein the first set of motion data is collected by the motion sensor while the electronic device is operating in an unrestricted mode.

3. The method of claim 1, wherein configuring the electronic device to operate in the restricted mode comprises reactivating the restricted mode.

4. The method of claim 1, further comprising:
    obtaining, by the electronic device, a second set of motion data collected by the motion sensor comprised in the electronic device;
    wherein the second set of motion data corresponds to a second gesture or second movement detected by the motion sensor;
    based on the second set of motion data, determining whether a second triggering condition for activating an unrestricted mode for the electronic device has been detected;
    responsive to determining that the second triggering condition for activating the unrestricted mode for the electronic device has been detected:
        configuring the electronic device to operate in the unrestricted mode.

5. The method of claim 1, wherein the electronic device comprises one of: a laptop computer, a desktop computer, a tablet computer, a smartphone, a head-mounted display, or a wearable device.

6. The method of claim 5, wherein the electronic device comprises the wearable device;
    wherein the triggering condition comprises a particular type of movement of a user's arm.

7. The method of claim 1, wherein the first user application provides a first functionality comprising one of: a communication function, a display function, executing an application, receiving input via a touch sensitive screen, transmitting messages, receiving messages, placing telephone calls, receiving telephone calls, or accessing a network.

8. A non-transitory computer-readable medium including one or more sequences of instructions that, when executed by one or more processors, cause the one or more processors to perform operations comprising:
    obtaining, by an electronic device, a first set of motion data collected by a motion sensor comprised in the electronic device;

wherein the first set of motion data corresponds to a first gesture or first movement detected by the motion sensor;

based on the first set of motion data, determining whether a first triggering condition for activating a restricted mode for the electronic device has been detected;

responsive to determining that the first triggering condition for activating the restricted mode for the electronic device has been detected:

configuring the electronic device to operate in the restricted mode, wherein while the electronic device is operating in the restricted mode, a first user application executes in a fully functional mode while a second user application is disabled.

9. The non-transitory computer-readable medium of claim 8, wherein the first set of motion data is collected by the motion sensor while the electronic device is operating in an unrestricted mode.

10. The non-transitory computer-readable medium of claim 8, wherein configuring the electronic device to operate in the restricted mode comprises reactivating the restricted mode.

11. The non-transitory computer-readable medium of claim 8, the operations further comprising:

obtaining, by the electronic device, a second set of motion data collected by the motion sensor comprised in the electronic device;

wherein the second set of motion data corresponds to a second gesture or second movement detected by the motion sensor;

based on the second set of motion data, determining whether a second triggering condition for activating an unrestricted mode for the electronic device has been detected;

responsive to determining that the second triggering condition for activating the unrestricted mode for the electronic device has been detected:

configuring the electronic device to operate in the unrestricted mode.

12. The non-transitory computer-readable medium of claim 8, wherein the electronic device comprises one of: a laptop computer, a desktop computer, a tablet computer, a smartphone, a head-mounted display, or a wearable device.

13. The non-transitory computer-readable medium of claim 12, wherein the electronic device comprises the wearable device;

wherein the triggering condition comprises a particular type of movement of a user's arm.

14. The non-transitory computer-readable medium of claim 8, wherein the first user application provides a first functionality comprising one of: a communication function, a display function, executing an application, receiving input via a touch sensitive screen, transmitting messages, receiving messages, placing telephone calls, receiving telephone calls, or accessing a network.

15. A system comprising:

one or more processors; and a non-transitory computer-readable medium including one or more sequences of instructions that, when executed by the one or more processors, cause the one or more processors to perform operations comprising:

obtaining, by an electronic device, a first set of motion data collected by a motion sensor comprised in the electronic device;

wherein the first set of motion data corresponds to a first gesture or first movement detected by the motion sensor;

based on the first set of motion data, determining whether a first triggering condition for activating a restricted mode for the electronic device has been detected;

responsive to determining that the first triggering condition for activating the restricted mode for the electronic device has been detected:

configuring the electronic device to operate in the restricted mode, wherein while the electronic device is operating in the restricted mode, a first user application executes in a fully functional mode while a second user application is disabled.

16. The system of claim 15, wherein the first set of motion data is collected by the motion sensor while the electronic device is operating in an unrestricted mode.

17. The system of claim 15, wherein configuring the electronic device to operate in the restricted mode comprises reactivating the restricted mode.

18. The system of claim 15, the operations further comprising:

obtaining, by the electronic device, a second set of motion data collected by the motion sensor comprised in the electronic device;

wherein the second set of motion data corresponds to a second gesture or second movement detected by the motion sensor;

based on the second set of motion data, determining whether a second triggering condition for activating an unrestricted mode for the electronic device has been detected;

responsive to determining that the second triggering condition for activating the unrestricted mode for the electronic device has been detected:

configuring the electronic device to operate in the unrestricted mode.

19. The system of claim 15, wherein the electronic device comprises one of: a laptop computer, a desktop computer, a tablet computer, a smartphone, a head-mounted display, or a wearable device.

20. The system of claim 19, wherein the electronic device comprises the wearable device; wherein the triggering condition comprises a particular type of movement of a user's arm.

* * * * *